United States Patent
Nguyen et al.

(10) Patent No.: US 11,221,685 B2
(45) Date of Patent: Jan. 11, 2022

(54) SUB-THRESHOLD ADDRESSING AND ERASING IN A MAGNETO-ELECTROPHORETIC WRITING MEDIUM

(71) Applicant: E Ink Corporation, Billerica, MA (US)

(72) Inventors: Crystal Nguyen, Bedford, MA (US); Evan Griffith, Marlborough, MA (US); Seth J. Bishop, Framingham, MA (US); Stephen J. Telfer, Arlington, MA (US); Kosta Ladavac, Somerville, MA (US); Andrew A. Drabek, Belmont, MA (US); Sunil Krishna Sainis, Melrose, MA (US); Richard J. Paolini, Jr., Framingham, MA (US); Samantha Morrill, Nashua, NH (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/720,452

(22) Filed: Dec. 19, 2019

(65) Prior Publication Data
US 2020/0201454 A1 Jun. 25, 2020

Related U.S. Application Data

(60) Provisional application No. 62/784,301, filed on Dec. 21, 2018, provisional application No. 62/789,239, filed on Jan. 7, 2019.

(51) Int. Cl.
*G06F 3/0354* (2013.01)
*G06F 3/038* (2013.01)
(Continued)

(52) U.S. Cl.
CPC .......... *G06F 3/03545* (2013.01); *G02F 1/167* (2013.01); *G02F 1/1673* (2019.01); *G02F 1/1685* (2019.01); *G06F 3/0383* (2013.01)

(58) Field of Classification Search
CPC .......... G02F 1/165; G02F 1/166; G02F 1/673; G06F 3/0383; G06F 3/041; G06F 3/0412;
(Continued)

(56) References Cited

U.S. PATENT DOCUMENTS

| | | |
|---|---|---|
| 3,292,171 A | 12/1966 | Wilson |
| 3,683,382 A | 8/1972 | Ballinger |

(Continued)

FOREIGN PATENT DOCUMENTS

EP 2343344 A1 7/2011

OTHER PUBLICATIONS

Henzen, A. et al., "The present and future of electronic paper", SID vol. 14, Issue 5, pp. 437-442 (May 2006).
(Continued)

*Primary Examiner* — Alexander Eisen
*Assistant Examiner* — Nelson Lam
(74) *Attorney, Agent, or Firm* — Ioannis Constantinides

(57) ABSTRACT

A magneto-electrophoretic medium that can be globally and locally addressed and erased. The medium provides a writeable display with no perceivable lag and the ability to write and erase with only minimal power requirements. In particular, the magneto-electrophoretic medium can be erased by providing a subthreshold electric stimulus and supplementing a second non-electric stimulus that disturbs the written state and allows the magneto-electrophoretic particles to return to their original state.

23 Claims, 17 Drawing Sheets

(51) Int. Cl.
   *G02F 1/1685* (2019.01)
   *G02F 1/1673* (2019.01)
   *G02F 1/167* (2019.01)
(58) Field of Classification Search
   CPC ........ G06F 3/0414; G06F 3/042; G06F 3/043; G06F 3/044; G06F 3/045; G06F 3/046; G06F 3/047
   USPC .................................................. 345/173–179
   See application file for complete search history.

(56) References Cited

U.S. PATENT DOCUMENTS

| | | | |
|---|---|---|---|
| 4,143,472 A | 3/1979 | Murata et al. | |
| 5,057,363 A | 10/1991 | Nakanishi | |
| 5,872,552 A | 2/1999 | Gordon, II et al. | |
| 5,972,493 A | 10/1999 | Iwasaki et al. | |
| 6,130,774 A | 10/2000 | Albert et al. | |
| 6,144,361 A | 11/2000 | Gordon, II et al. | |
| 6,172,798 B1 | 1/2001 | Albert et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,583,780 B1 | 6/2003 | Kawai | |
| 6,672,921 B1 | 1/2004 | Liang et al. | |
| 6,788,449 B2 | 9/2004 | Liang et al. | |
| 6,831,771 B2 | 12/2004 | Ho et al. | |
| 6,866,760 B2 | 3/2005 | Paolini, Jr. et al. | |
| 6,870,661 B2 | 3/2005 | Pullen et al. | |
| 6,922,276 B2 | 7/2005 | Zhang et al. | |
| 6,950,220 B2 | 9/2005 | Abramson et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,075,502 B1 | 7/2006 | Drzaic et al. | |
| 7,116,318 B2 | 10/2006 | Amundson et al. | |
| 7,170,670 B2 | 1/2007 | Webber | |
| 7,304,787 B2 | 12/2007 | Whitesides et al. | |
| 7,312,784 B2 | 12/2007 | Baucom et al. | |
| 7,352,353 B2 | 4/2008 | Albert et al. | |
| 7,411,719 B2 | 8/2008 | Paolini, Jr. et al. | |
| 7,420,549 B2 | 9/2008 | Jacobson et al. | |
| 7,453,445 B2 | 11/2008 | Amundson | |
| 7,535,624 B2 | 5/2009 | Amundson et al. | |
| 7,679,814 B2 | 3/2010 | Paolini, Jr. et al. | |
| 7,839,564 B2 | 11/2010 | Whitesides et al. | |
| 7,999,787 B2 | 8/2011 | Amundson et al. | |
| 8,009,348 B2 | 8/2011 | Zehner et al. | |
| 8,139,039 B2 | 3/2012 | Schneider et al. | |
| 8,319,759 B2 | 11/2012 | Jacobson et al. | |
| 8,558,783 B2 | 10/2013 | Wilcox et al. | |
| 8,629,839 B2* | 1/2014 | Levin | G10L 13/00 345/173 |
| 8,964,282 B2 | 2/2015 | Wang et al. | |
| 8,994,705 B2 | 3/2015 | Jacobson et al. | |
| 9,880,646 B2* | 1/2018 | Sainis | G02F 1/167 |
| 10,037,089 B2 | 7/2018 | Bishop et al. | |
| 10,324,577 B2* | 6/2019 | Sainis | G02F 1/167 |
| 10,388,233 B2* | 8/2019 | Paolini, Jr. | G09G 3/344 |
| 10,475,396 B2 | 11/2019 | Sim et al. | |
| 11,086,417 B2* | 8/2021 | Griffith | G06F 3/03545 |
| 2003/0137521 A1* | 7/2003 | Zehner | G09G 3/344 345/589 |
| 2004/0119680 A1* | 6/2004 | Daniel | G09G 3/344 345/107 |
| 2010/0208330 A1* | 8/2010 | Uchino | G02F 1/167 359/296 |
| 2011/0292495 A1* | 12/2011 | Ho | G09F 9/375 359/296 |
| 2012/0293858 A1 | 11/2012 | Telfer et al. | |
| 2014/0009818 A1 | 1/2014 | Brochon et al. | |
| 2016/0202507 A1* | 7/2016 | Ebisui | G02F 1/167 345/174 |
| 2016/0239113 A1* | 8/2016 | Bishop | G09G 3/344 |
| 2016/0239114 A1* | 8/2016 | Sainis | G06F 3/03545 |
| 2017/0061895 A1* | 3/2017 | Paolini, Jr. | G09G 3/344 |
| 2017/0336896 A1* | 11/2017 | Paolini, Jr. | G09G 3/344 |
| 2018/0246598 A1* | 8/2018 | Sainis | G06F 3/046 |
| 2018/0364542 A1 | 12/2018 | Widger et al. | |

OTHER PUBLICATIONS

De Gennes, P.G. et al., "Pair Correlations in a Ferromagnetic Colloid", Phys kondens Materie, vol. 11, Issue 3, pp. 189-198 (Aug. 1970).

Holm, C. et al., "The Structure of Ferrofluids: A Status Report", Curr. Opinion in Coll. & Int. Sci., vol. 10, pp. 133-140 (2005).

Klapp, Sabine H. L., "Dipolar Fluids under External Perturbations", J. Phys.: Condens. Matter, vol. 17, pp. R525-R550, (2005).

Gerth, Sabrina et al., "Is Handwriting Performance Affected by the Writing Surface? Comparing Preschoolers', Second Graders', and Adults' Writing Performance on a Tablet vs. Paper", Front. Psychol., vol. 7, Issue 1308, pp. 1-18, (2016).

Gupta, Ajay Kumar et al., "Synthesis and surface engineering of iron oxide nanoparticles for biomedical applications", Biomaterials, vol. 26, Issue 18, pp. 3995-4021 (2005).

Korean Intellectual Property Office, PCT/US2019/067672, International Search Report and Written Opinion, dated Apr. 20, 2020.

\* cited by examiner

SUB-THRESHOLD ADDRESSING AND ERASING IN A MAGNETO-ELECTROPHORETIC WRITING MEDIUM

RELATED APPLICATIONS

This application claims priority to U.S. Provisional Patent Application No. 62/784,301, filed Dec. 21, 2018, and U.S. Provisional Patent Application No. 62/789,239, filed Jan. 7, 2019. All patents, patent applications, and references disclosed are incorporated herein by reference in their entireties.

BACKGROUND

The technology described herein relates to magnetically-addressable displays and related apparatus and methods.

For decades it has been a goal of electronic paper research to match the experience of writing on paper, or, at in a larger format, to mimic the feel and appearance of drawing on a chalk board or a white board. See, A. Henzen, J. van de Kamer, "The present and future of electronic paper," *Journal of the S.I.D.* 14/5, 437-442 (2006). Because electrophoretic displays are Lambertian reflectors of ambient light with excellent contrast ratios both indoors as well as in direct sunlight, they provide a paper-like reading and viewing experience. However, current commercial embodiments of writable electrophoretic devices require tens of milliseconds for each electrical image refresh. Thus, when a stylus interacts with the display medium via a touch sensor, there are additional delays in conveying information about a line to be rendered by the display controller. The result is a latency between the act of writing and the appearance of an image on the display that can be on the order of 50-100 milliseconds. See, e.g., SONY DPT-RP1, writeable tablet, which includes an electrophoretic display manufactured by E Ink Corporation.

It would be preferred to have a method for directly writing onto an electronic/rewriteable ink with a stylus that could be located in great proximity to the active layer, thereby increasing the natural feedback of moving a stylus and seeing the image created below. Simple devices with such response have been known for some time, however they have more typically been incorporated into toys. For example, a magnetic drawing board including a suspension of ferromagnetic particles that is addressed by a magnetic pen or magnetic stamps. A rudimentary product including this technology was developed by Pilot Corporation in the 1970s, which was improved to become the child's toy MAGNA DOODLE (now produced by Cra-Z-Art, Randolph, N.J.). See, U.S. Pat. No. 4,143,472.

Since this time, E Ink Corporation, SiPix Imaging Inc., and Seiko Epson, have all disclosed magnetically-addressable electrophoretic display designs in which at least a portion of the charged pigment particles used in conventional electronic paper displays have been replaced by charged ferromagnetic particles. See, U.S. Pat. Nos. 6,583,780; 6,831,771; 6,870,661; and 7,352,353. The disclosed constructions produced reflective (sunlight-readable) display media responsive to both electric and magnetic fields. As such, these magneto-electrophoretic displays may be addressed with a magnetic stylus or with electric fields. Additionally, the electronic display may be synchronized to activate pixels corresponding to those over which the stylus passed, e.g., using a digitizer.

In the instance where the magneto-electrophoretic medium is state stable (persistent bistable, etc.), it is impossible to achieve a "local" erase using only a simple stylus or eraser. Rather, the entire display can be cleared (a.k.a. "global" erase) by driving the electrophoretic particles back to their starting positions with suitable clearing waveforms, or smaller areas can be erased with localized rotating electric fields, e.g., as described in U.S. Pat. No. 10,037,089. However, it is not possible to simply flip the stylus over and erase what has been drawn, like using a pencil, or to pick up an eraser and remove errant lines, like a blackboard or white board.

SUMMARY

The invention includes electro-optic displays that can be addressed with both electric fields and magnetic fields and provide both global and local erasing. In particular, displays of the invention can be addressed with, e.g., a magnetic stylus, stamp, etc., and they can be globally erased with switching electric fields or they can be locally erased with a combination of electric fields and an additional stimulus, such as a different magnetic field. Because the electro-optic display is quite thin and the stylus tip is quite near the active layer, there is negligible parallax offset between the tip of the stylus and the written line. Furthermore, the materials of construction are flexible, thereby enabling a rewritable display that can be rolled-up like paper or bent to fit the contours of a non-planar surface. In some embodiments, the display can be cut with shears or laser-cut to match a desired shape.

Generally, a magneto-electrophoretic display includes a front electrode, a rear electrode, and a magneto-electrophoretic medium sandwiched between the front and rear electrodes. The magneto-electrophoretic medium comprises a fluid including electrically-charged magnetic (or magnetizable) particles, thus the magneto-electrophoretic particles respond to both magnetic fields and electric fields as well as combinations of electric and magnetic fields. In some embodiments, the display system includes a second set of electrophoretic particles configured to move in response to application of an electric field, wherein the first and second sets of particles have opposite electric charges and contrasting colors. In some embodiments, the fluid is a color that contrasts with the color of the first set of magneto-electrophoretic particles. In some embodiments the front electrode is light-transmissive. In some embodiments, both the front and the rear electrodes are light-transmissive. In some embodiments, the fluid in the display layer is encapsulated. For example, the fluid may be encapsulated in collagen microcapsules or pre-fabricated microcells (e.g., thermoformed or lithographed). A controller is typically used to provide a suitable voltage between the front and rear electrodes. The voltage may be time-dependent, a.k.a. waveform, and may cause the magneto-electrophoretic particles to move toward or away from the front electrode, or it may cause the magneto-electrophoretic particles to move closer together or further apart from each other.

A magneto-electrophoretic display may be locally addressed and locally erased with a stylus having a body with a first magnetic end and a second magnetic end. The stylus includes a first magnet proximal to the first end and providing a first magnetic field between 500 Gauss and 5000 Gauss at the first end, a second magnet proximal to the second end and providing a second magnetic field between 10 Gauss and 500 Gauss at the second end, a wireless transmitter within the stylus body, and a switch on the body of the stylus, operatively connected to the wireless transmitter. The first or the second magnet may comprise neodymium. The wireless transmitter may be a BLUETOOTH or ZIGBEE transmitter. The stylus may additionally include a wireless receiver or transceiver.

In general, the magnetic strength of the magnetic stylus used for local addressing (e.g., first magnetic end) should be stronger than the stylus/eraser used for the local erasing (e.g., second magnetic end). The local erasing uses a combination of electric field and magnetic stylus simultaneously. In many embodiments, the electric field used for the local erasing is less than the field used to globally erase the media. The electrical pulses may include a combination of higher frequency (AC) and a lower frequency (DC) to assist with suppression of switching transients that may appear with the local erasing pulse sequences.

Using, e.g., a magnetic stylus, a magneto-electrophoretic display may be incorporated into a writing system that additionally includes a voltage controller configured to provide both a global erase mode and a local erase mode. Such a system would, thus include, a magneto-electrophoretic display including a first electrode that is light-transmissive, a second electrode, and a magneto-electrophoretic medium disposed between the first electrode and the second electrode, the magneto-electrophoretic medium comprising charged magnetic particles; a stylus comprising a magnetic tip; and a voltage controller configured to supply voltage between the first electrode and the second electrode. The voltage controller has at least two modes: a first (global erase) mode in which the voltage controller provides a first voltage sufficient to drive the charged magnetic particles toward a viewing surface at the first electrode, and a second (local erase) mode in which the voltage controller provides a second voltage greater than zero but insufficient to drive the charged magnetic particles toward the viewing surface at the first electrode, but sufficient to drive the charged magnetic particles toward the viewing surface at the first electrode when a supplemental magnetic field is supplied. For the purposes of this disclosure, "insufficient to drive" the charged magnetic particles toward the viewing surface at the first electrode implies that the electric field, alone, does not cause the display to switch states, i.e., cause an observable change in reflective state, i.e., change by more than 10 L*, in a relevant amount of time, e.g., less than 10 seconds, e.g., less than five seconds, e.g., less than two seconds.

Accordingly, the controller facilitates a method for erasing a magneto-electrophoretic medium including particles, the method including providing an electric field stimulus to the magneto-electrophoretic medium, the electric field stimulus being greater than zero but insufficient to cause the magneto-electrophoretic medium to switch from a first state to a second state; and providing a non-electric field stimulus to the magneto-electrophoretic medium, thereby causing the magneto-electrophoretic medium to switch from the first state to the second state. The non-electric field stimulus may be magnetic, ultrasound, pressure, vibration, light, or heat. In the instance that the non-electric field stimulus is magnetic, the erasing may be achieved with a stylus including a magnet providing a field strength between 10 and 1000 Gauss at the surface of the stylus. Alternatively, the magnetic stimulus may be provided by a striped-pole magnetic material. Typically, the electric field stimulus used during the local erase is less than one half of the voltage required to cause the magneto-electrophoretic medium to switch from the first state to the second state over the same period (i.e., global erase). For example, the electric field stimulus used during local erase may be one third of the magnitude of the electric field stimulus used during global erase. In some embodiments, the electric field stimulus comprises a time-varying waveform. The method may further include remnant voltage management, which improves the overall erasing experience for the user. Typically, remnant voltage management includes measuring a remnant voltage on the magneto-electrophoretic medium and modifying the time-varying waveform to diminish the remnant voltage on the magneto-electrophoretic medium. In some embodiments, the time-varying waveform is modified by changing the offset of the time-varying waveform, or changing the duty cycle of the time-varying waveform, or changing the amplitude of the time-varying waveform. In some embodiments, the electric field stimulus comprises a time-varying waveform with a duty cycle of less than 50%.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
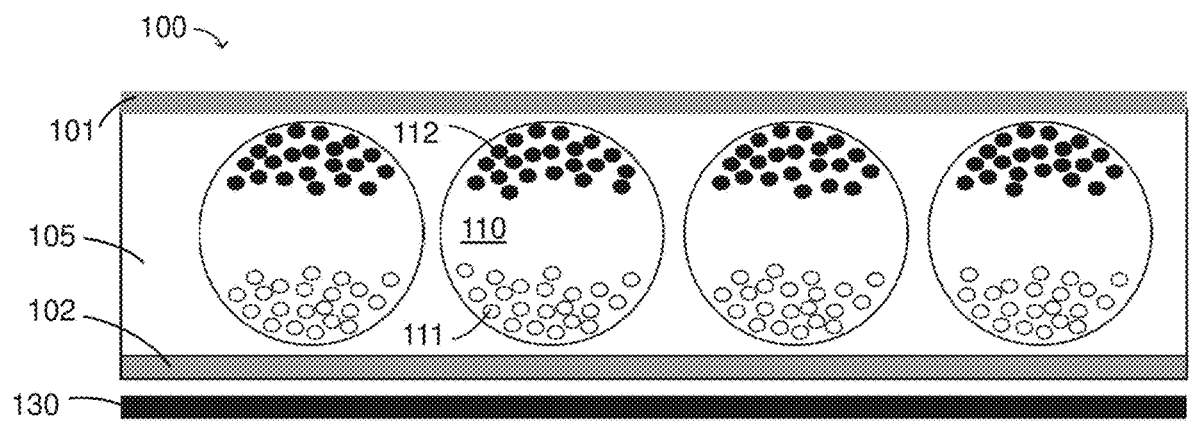
FIG. 1 is a schematic drawing depicting a magneto-electrophoretic display including black magneto-electrophoretic particles and white non-magnetic electrophoretic particles. The black and white particles have opposite electric charges.

As described herein a magnetically-responsive display can be constructed to allow a user to have the ability to write and erase on a global and local scale with no discernable lag and without the need for an active matrix backplane [however the magneto-electrophoretic media described herein can be used with an active matrix backplane, as well as an electronic digitizer, such as sold by WACOM]. The magneto-electrophoretic media contains magnetic particles that can be switched electrically in the same way as a conventional electrophoretic display: e.g., between white and black states with the capability of also attaining stable intermediate states of gray. When addressed with a magnetic stylus, the magneto-electrophoretic media fluid exhibits a gray state that is intermediate in optical density between the extreme electrophoretic white and black states. Thus, starting from a white state, the magnetic stylus can produce a relatively dark image, while starting from a black state a lighter image can be formed. The magneto-electrophoretic media display can be combined with segmented electrodes to produce a very large area writable surface (i.e., a magnetically-addressable writing board), or used in conjunction with a TFT backplane to make a graphics-capable display that can be electrically addressed, but has the additional capability of being writable with a magnetic stylus with no visible latency. If desired, the initially produced, magnetically-written image can be subsequently refreshed by electrical addressing to provide higher contrast, straighter lines, digitized characters, etc.

When used with a stylus described herein, there is an insufficiently strong magnetic field present in regions not directly contacted by the magnetic writing stylus to cause pigment motion, thus there is no visible lag between writing and the appearance of an image. Also, because there is no need for a relatively thick glass layer to separate the stylus from the active layer, there is negligible parallax offset between the tip of the stylus and the written line. For both these reasons the experience of writing with a magnetic stylus onto E Ink's magnetically-sensitive ink is very similar to that of writing with a pen or pencil on paper. The term "writing implement" or "stylus" as used herein includes any suitable handheld device, such as those shaped like a pencil, a pen or a marker. For example, a magnetic marker may generate a magnetic field and may be used to magnetize regions of a magnetizable material.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence, or in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states. Further, as used herein, the extreme states include the dark and light states resulting from driving an display magnetically, which typically do not achieve the extreme black and white states but achieve dark gray (almost black) and light gray (almost white) states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As used herein, an "image" refers to a spatial representation, and is to be distinguished in at least some embodiments from data (e.g., digital 1's and 0's) from which an image may be derived. As will be described further below, images according to embodiments of the present application may include a picture, text, shapes, or any other pattern, and in some embodiments may be embodied as any arrangement or pattern of magnetized regions of a magnetic recording layer that may be transferred or reproduced on a magnetically responsive display. An image may be visible, for example when produced on a display as just described. However, an "image" as used herein may be invisible, at least to the naked eye, in some embodiments. For example, as described herein, an image may be embodied as magnetized regions of a magnetic recording layer. The spatial representation of the magnetized regions may be invisible to the naked eye, but nonetheless represent an image, for example a picture, text and/or shapes.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 6,870,661, 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 7,075,502 and 7,839,564;

(f) Methods for driving displays; see for example U.S. Pat. Nos. 7,012,600, 7,304,787 and 7,453,445;

(g) Applications of displays; see for example U.S. Pat. Nos. 7,312,784 and 8,009,348; and (h) Non-electrophoretic displays, as described in U.S. Pat. Nos. 6,241,921; 6,950,220; 7,420,549 8,319,759; and 8,994,705 and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, in the name of SiPix Imaging, Inc., now in the name of E Ink California, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; 6,184,856; 7,304,787 and 7,999,787. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

In magnetically addressable displays having two particles, for example, black and white particles, magnetic addressing only generates gray states of varying degrees of lightness or darkness. The magnetic field may be tuned to the desired gray state. Electrical switching, i.e., an electro-optic display, is required to drive the particles to achieve full black and white optical states. In magnetically addressable displays, the black state is not required to be fully black, simply dark. Likewise, the white state is not required to be fully white, simply light. The focus is on the difference between the background and the magnetically addressed area to display the image. As used herein, black state refers to the dark state, including the fully black state associated with electrical addressing, and white state refers to the light state, including the fully white state associated with electrical addressing. From either optical state (dark or light), the magnetic stylus drives the pigment particles towards a gray state. From a black or dark state, the magnetic stylus switches the optical state toward a lighter gray state. From a white state or light state, the magnetic stylus switches the optical state toward a darker gray state.

As an alternative to addressing with a magnetic stylus or print head, regions of a magnetizable material within a recording layer (e.g., including a magneto-electrophoretic medium) may be magnetized via a fixed magnetic writing implement. The recording layer may subsequently be brought into proximity with a magnetically responsive display layer, thereby producing a facsimile of the regions of the magnetizable material previously magnetized by the writing implement. In some embodiments, regions of a magnetizable material may be magnetized by a magnetic writing implement while in proximity to a magnetically responsive display layer, such that the writing implement causes both a change in an optical state of the display layer in addition to magnetizing the regions of the magnetizable material. The recording layer may be separated from the display layer and subsequently brought into proximity with the same or a different display layer.

According to some embodiments, a magnetically responsive display layer within an electronic display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. According to some embodiments, a magnetically responsive display layer within a magnetically responsive (non-electronic) display system may be a particle-based display layer. In some cases, the particles may include one or more types of pigments. In a single-pigment display, the pigment may be both electrically and magnetically controllable. In a multi-pigment display, at least one of the pigment types may be both electrically and magnetically controllable. One example of a multi-pigment display is a display including white pigment particles and black pigment particles. The black pigment particles may be both electrically and magnetically controllable, as an example. In a multi-pigment display, pigment colors may be colors other than black and white. In multi-pigment displays, a color overlay may be used to change the perceived color of the pigment particles, especially when white pigment particles are included.

According to some embodiments, a particle-based display layer may include white and black pigment particles, black pigment particles may, in some states, be located toward the front of the display such that incident light is largely absorbed by the black particles. A magnetic field produced by an addressing magnet, e.g., a magnetic stylus, may change an optical state of the display such that the black particles clump, gather, or chain together thereby allowing the incident light to be reflected by the white particles underlying the black particles. The change in optical state may additionally include movement of the white and/or black particles within the display. Alternatively, a multi-pigment display may be configured to instead locate white pigment particles toward the front of the display such that incident light is largely reflected by the white particles. A magnetic field produced by a stylus may then change an optical state of the display such that more of the incident light is absorbed by the black particles. In such an embodiment, when black particles are moved toward the front of the display using a magnetic field, a dark gray state rather than an extreme black state occurs. Likewise, when white magneto-electrophoretic particles are moved towards the front of the display using a magnetic field, a light gray or white gray state occurs.

The particle-based electro-optic display may include one or more pigment types. In a multi-pigment display, at least one of the pigment types may be both electrically- and magnetically-controllable. An example of a multi-pigment display is a display including white pigment particles and black pigment particles. The black pigment particles may be both electrically and magnetically controllable, as an example. The black or the white pigments may be ferromagnetic or paramagnetic. Commercially-available magnetic particles, such as Bayferrox 8600, 8610; Northern Pigments 604, 608; Magnox 104, TMB-100; Columbian Mapico Black; Pfizer CX6368, and CB5600 and the like, may be used alone or in combination with other known pigments to create pigments that are both electrically and magnetically controllable. In general, magnetic particles having a magnetic susceptibility between 50-100, a coercivity between 40-120 Oersted (Oe), a saturation magnetization between 20-120 emu/g, and a remanence between 7-20 emu/g are preferred. Additionally, it may be beneficial for the particles to have diameters between 100-1000 nanometers (nm). As a specific, but non-limiting, example, the pigment of an electro-optic display in some embodiments may be a form of magnetite (Iron Oxide, such as Bayferrox 318M), neodymium oxide (such as Sigma Aldrich 634611 Neodymium (III) Oxide), iron and copper oxide (such as Sigma Aldrich Copper Ferrite), or an alloy of iron and cobalt or iron and nickel (such as Sigma Aldrich Iron-Nickel Alloy Powder and American Elements Iron-Cobalt Alloy Nanopowder).

The strength of the magnetic field produced by the writing implement may also be at a level selected to provide beneficial operation of electro-optic display. For example, the magnetic field produced by the writing implement (e.g., stylus) may be at least 1 milliTesla (mT) (10 Gauss). In practice, generating magnetic fields in excess of 1 T (10,000 Gauss) inside the ink may be technically and economically prohibitive. Thus, in some embodiments the magnetic field applied may be between 1 mT and 1 T, for example between 10 Gauss and 10,000 Gauss, for example, between 100 Gauss and 1000 Gauss.

A magneto-electrophoretic particle-based display layer may, according to some embodiments, include a single type of magnetically responsive black pigment particles that may be configured to form chains or pillars when exposed to a magnetic field produced by a magnetic stylus such that the display can transmit a substantial portion of light. In such a case, the response of the black pigment particles to the magnetic field act like a "shutter," effectively altering their state from a "shutter closed" state in which incident light is largely absorbed by the black particles, to a "shutter open" state in which the black pigment particles substantially no longer absorb light incident to the display. Additionally, such shutter-mode devices may be electrically-driven between a light-transmissive and a closed state. Such shuttering displays may be paired with reflective and/or colored backings, such that the shuttering effect is between a darkened state and viewing the rear surface. Alternatively, a shutter mode display including a magneto-electrophoretic medium may include a colored fluid in the medium such that the medium switches between a dark state and a colored state, or between a light state and a colored state, depending upon the color of the magneto-electrophoretic particles.

The aspects and embodiments described above, as well as additional aspects and embodiments, are described further below. These aspects and/or embodiments may be used individually, all together, or in any combination of two or more, as the application is not limited in this respect.

FIG. 1 depicts magneto-electrophoretic display layer, according to some embodiments. Display 100 includes front and back electrodes 101 and 102, respectively. The front electrode 101 is light-transmissive while the back electrode 102 is optionally light transmissive. The front electrode is typically formed from a transparent conductive polymeric medium such as PET-ITO or PEDOT, however alternative light-transmissive polymers (polyesters, polyurethanes, polystyrene) doped with conductive additives (metals, nanoparticles, fullerenes, graphene, salts, conductive monomers) are also suitable for use. The back electrode 102 may comprise any of the components listed for the front electrode 101, however the back electrode can also be a metal foil, a graphite electrode, or some other conductive material. A segmented or TFT backplane can be also be used instead of the back electrode 102 to add more versatility in displaying printed and graphic information. In many embodiments, both the front and back electrodes 101 and 102, respectively, are flexible, thus the entire display 100 is also flexible. The display 100 is often supported by a substrate 130, which may also be light-transmissive and/or flexible. While not shown in FIG. 1, it is understood that that one or more adhesive layers are included in the construction in order to facilitate roll-to-roll processing as well structural integrity. Also not shown in FIG. 1 is the binder used to fill the gaps between microcapsules 110. The display 100 may additionally include a top protective sheet (not shown) to protect the front electrode 101 from being damaged by a stylus or other mechanical interaction. Filter layers (not shown) to change color or protect the medium from UV exposure may also be included.

Figure 2:
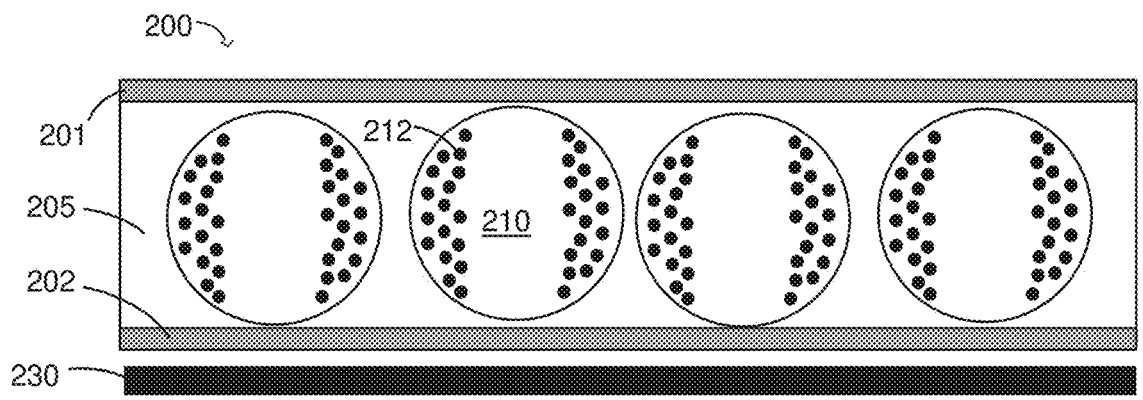
FIG. 2 is a schematic drawing depicting a magneto-electrophoretic display including black magneto-electrophoretic particles.
Figure 3:
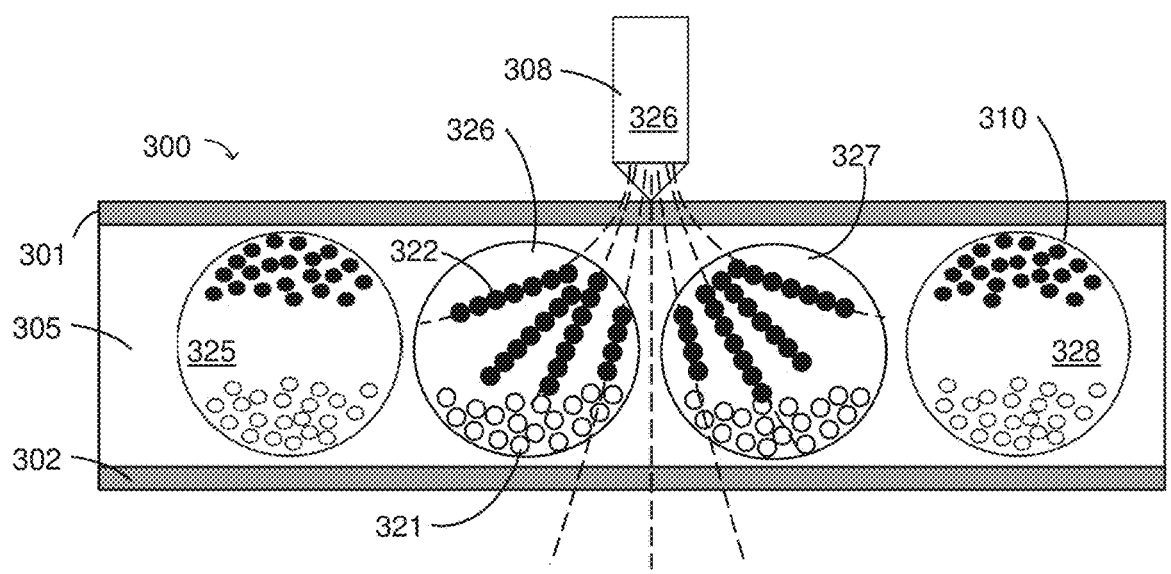
FIG. 3 is a schematic drawing showing a magnetic stylus causing a local change in an optical state of a display, according to some embodiments.

The display 100 includes a display layer 105, which is a particle-based display medium between electrodes 101 and 102 that includes a plurality of containers to segregate portions of the electrophoretic medium. In the instance of FIG. 1, the containers are microcapsules 110, and within the microcapsules 110 are liquid medium and one or more types of colored pigment particles, wherein at least one type of particle is magnetically-responsive. As shown in FIG. 1, this includes white pigment particles 111 and black pigment particles 112. One or both of pigments 111 and 112 may move within, or otherwise respond to, a magnetic field. For example, one or both types of pigment particles may align along magnetic field lines, and/or may form chains of particles (see FIG. 3). In such cases, one or both of pigments 111 and 112 may be electrically charged. The pigment particles 111 and/or 112 may be controlled (displaced) with an electric field (e.g., produced by electrodes 101-102), thus making the display 100 operate as an electrophoretic display when addressed. In addition, as depicted in FIGS. 1-3, the black pigment particles 112 are magnetically-responsive. It is understood that the capsules 110 could be replaced with microcells or polymer-dispersed droplets, as discussed in the patents and patent applications, above.

In some use cases, both pigments 111 and 112 may be configured to be displaced within an electric field. For example, one of pigments 111 and 112 may be positively charged and the other pigment may be negatively charged, such that an electric field applied across capsule 110 causes the pigment particles to separate to opposing sides of the capsule. By adjusting the direction of the electric field, the pigment that is located on the viewing side of the display 100 may be selected, thereby producing either a white or a black state as viewed by a user of the display.

In an alternative embodiment, the display 200 may comprise only a single type of magneto-electrophoretic particle 212, and the display 200 operates between "open" and "closed" through the motion of the particles 212, e.g., using the materials described in U.S. Patent Publication No. 2018/0364542, e.g., comprising a plurality of electrically charged particles, a liquid in which the particles are dispersed and a charge control agent ("CCA"), the charge control agent comprising an oligoamine-terminated polyolefin and a branched chain fatty acid comprising at least about 8 carbon atoms. In some instances, capsules 210 are formed from a coacervate of fish gelatin and acacia and they encapsulate an internal phase comprising a mixture of a non-polar solvent and charged magneto-electrophoretic particles 212. In displays 200, it is more typical for both front electrode 201 and rear electrode 202 to be light transmissive, and when present, substrate 230 is also light transmissive. Display 200 may also be constructed to be flexible. It is also understood that both display 100 and display 200 can be the basis for a laminate in which the substrate 130/230 may be a release sheet that is removed prior to affixing the display 100/200 to a new substrate, such as plastic, metal, or glass.

FIG. 3 depicts a stylus 308 causing a change in an optical state of a display 300, according to some embodiments. Display 300 is an example of the type of display 100 shown in FIG. 1 that includes white reflective pigment particles 321 that do not respond to a magnetic field, and black pigment particles 322 that form chains in the presence of a magnetic field. In the example of FIG. 3, a stylus 308 produces a magnetic field depicted in part by field lines 310 that causes black pigment particles 322 to form chains. Due to the shape and structure of the chains of black pigment particles, light entering display 300 from the viewing side may largely pass by black pigment chains 322 and be reflected from the white pigment particles 321. Accordingly, in the configuration shown in FIG. 3, capsules 326 and 327 will appear white (i.e., light gray), whereas capsules 325 and 328 will appear black (i.e., dark gray), on the viewing side of the display 300. Accordingly, where a stylus 308 causes chaining of pigment particles 322, such as in capsules 326 and 327, a facsimile of a drawn image representing the motion of the stylus 308 will be visible at the viewing surface of the display 300.

It will be appreciated that, although FIG. 3 illustrates an example of a display that is altered from a black state to a white state by a magnetic stylus, a display may similarly be produced that is altered from a white state to a black state by a magnetic stylus, and that FIG. 3 is merely one illustrative example of a display with which a magneto-electrophoretic display as described herein may be used. Furthermore, it will be appreciated that stylus 308 is not shown to scale relative to display 300, and that in practice the writing implement will generally be much larger than capsules 325-328. For example, the stylus 308 may cause a change of state of black pigment particles in a large number of capsules of display 300, and not merely the two illustrative capsules 326 and 327 shown in FIG. 3.

The stylus 308 includes a magnetic element 326 which is, for example, a strong neodymium magnet (N50 or N52; K&J Magnetics, Pipersville, Pa.), having a magnetic field strength 1000-2000 Gauss. Such field strengths allow fast natural handwriting at over 10:1 contrast ratio at speeds over 1 m/sec without any of the stylus lag notable for other electronic writing devices that utilize electronic touch screen interfaces. (See also, FIG. 19.) Obviously, the proximity of the stylus 308 to the magneto-electrophoretic display layer 305 will influence the time and rate of change between optical states in the display 300. In general, however, the distance 250 that may be sufficient to cause the change in optical state may be between 0.1 mm and 5 mm, such as between 0.5 mm and 3 mm, such as 1-2 mm.

Figure 4A:
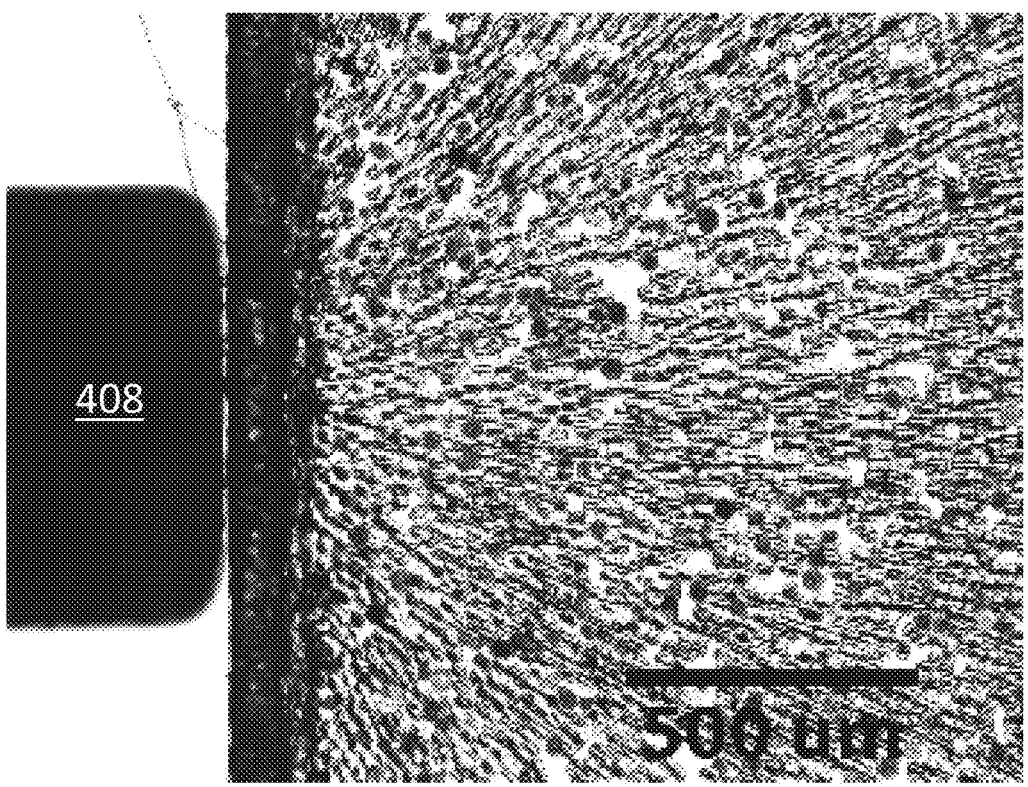
FIG. 4A is a visible light micrograph showing chaining of magneto-electrophoretic particles in an encapsulated magneto-electrophoretic medium. The magneto-electrophoretic particles roughly follow the magnetic field lines of an addressing magnetic stylus.
Figure 4B:
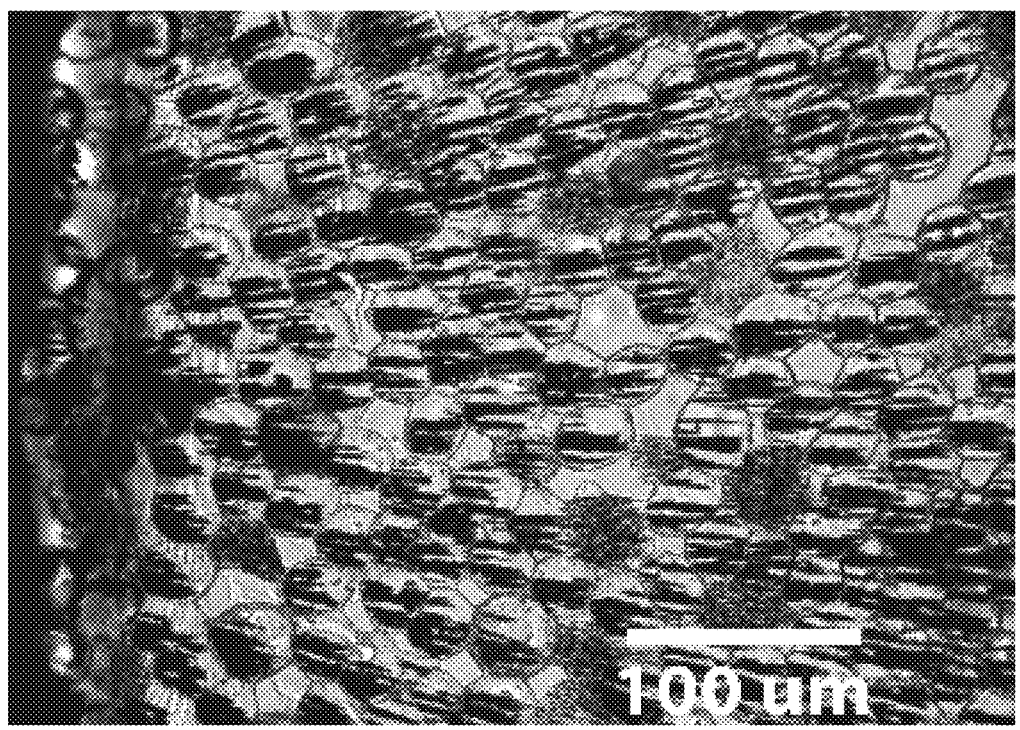
FIG. 4B is a zoomed view of the visible light micrograph of FIG. 4A.

While the following technical explanation is not intended to be limiting, it is useful for understanding the process through which the magneto-electrophoretic medium is locally addressed and locally erased: Evidence for the chaining mechanism depicted in FIG. 3 is shown in FIGS. 4A and 4B, which are transmission optical micrographs of the chained magnetic particles, as seen in microcapsules containing a solvent, charge-controlling surfactant, and magnetic black pigment particles but no white particles. (See FIG. 2.) As seen in both FIGS. 4A and 4B, the magnet 408 is located to the left side of the active area, which of course is not the orientation of a stylus used in writing. In FIG. 4B, especially, it is evident that the magnetic black particles are aligned and clumped together (i.e., chained) so that it is possible to view through the capsules. Because of the colloidal stability of the magneto-electrophoretic medium, this chained state is stable after the magnet is removed. In practice, when writing with a magnetic stylus, the final state of the chained pigments is roughly linear and parallel to the plane of the electrode layer because the last field lines experienced are approximately along the plane of the electrode layer as the stylus is move laterally over the surface of the display.

Figure 5A:
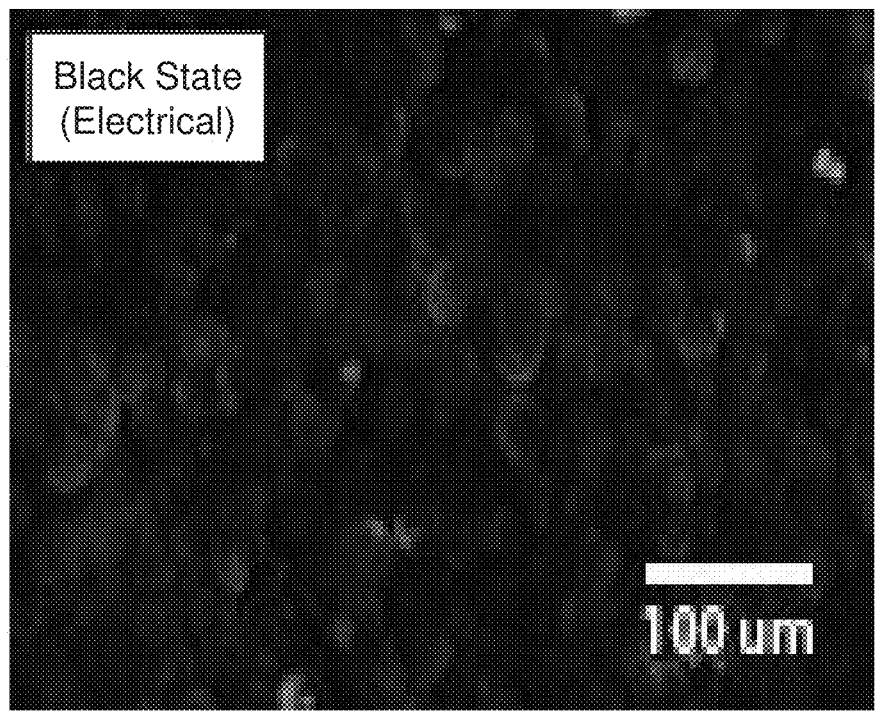
FIG. 5A is a visible light micrograph of an encapsulated magneto-electrophoretic medium comprising black magneto-electrophoretic particles and white non-magnetic electrophoretic particles when the black particles have been driven to the front light-transmissive electrode with an electric field.
Figure 5B:
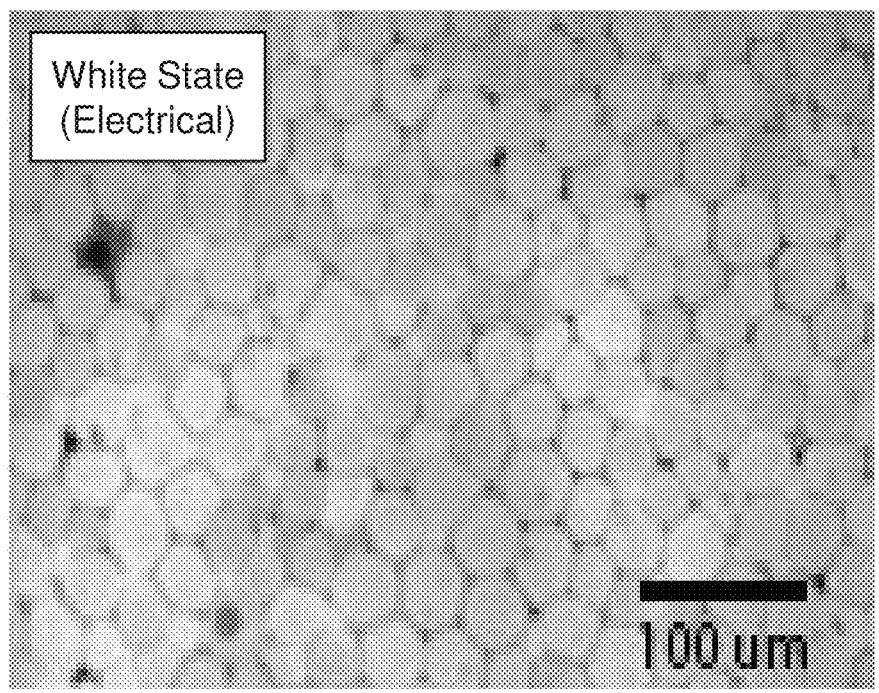
FIG. 5B is a visible light micrograph of an encapsulated magneto-electrophoretic medium comprising black magneto-electrophoretic particles and white non-magnetic electrophoretic particles when the white particles have been driven to the front light-transmissive electrode with an electric field.
Figure 5C:
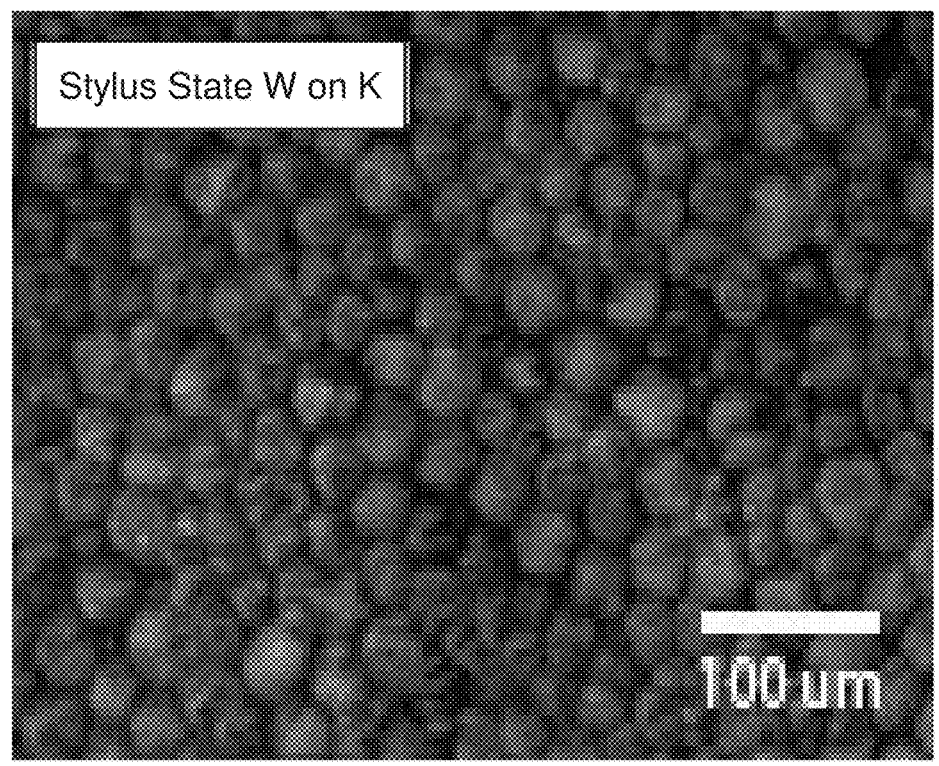
FIG. 5C is a visible light micrograph of an encapsulated magneto-electrophoretic medium comprising black magneto-electrophoretic particles and white non-magnetic electrophoretic particles wherein the black particles have been driven to the front light-transmissive electrode with an electric field and then caused to cluster together with a magnetic field.
Figure 5D:
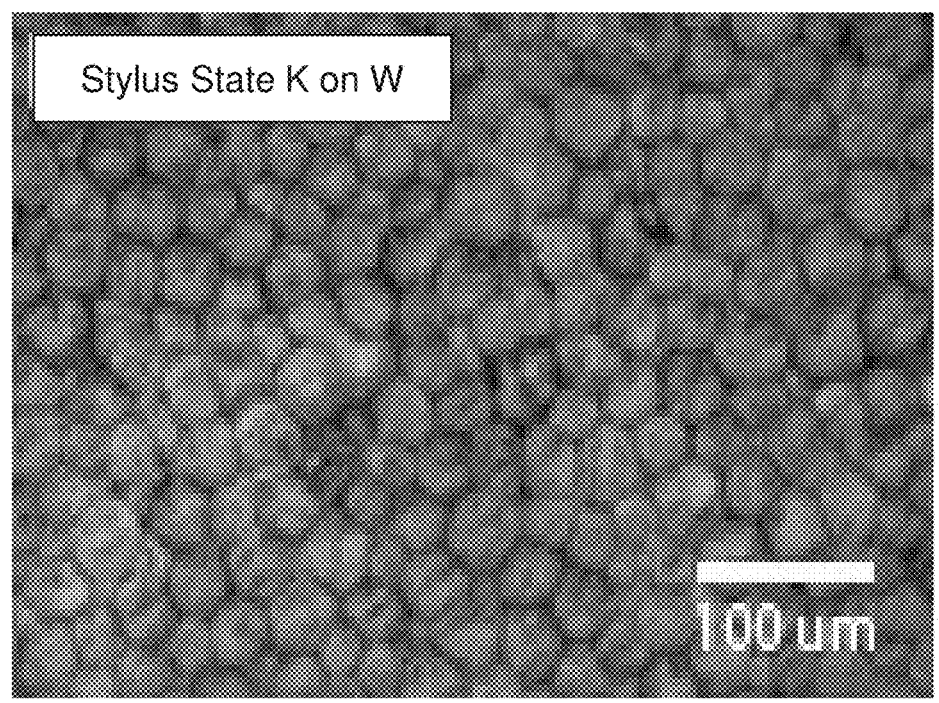
FIG. 5D is a visible light micrograph of an encapsulated magneto-electrophoretic medium comprising black magneto-electrophoretic particles and white non-magnetic electrophoretic particles wherein the white particles have been driven to the front light-transmissive electrode with an electric field and then the black particles are caused to cluster together with a magnetic field.

When a black magneto-electrophoretic pigment 322 and a white non-magnetic pigment 321 are combined, such as in FIGS. 1 and 3, the results of the chaining effect are rather pronounced, as evidenced in FIGS. 5A-5C. In FIG. 5A, the display layer 305 has been driven completely to a dark state by providing an electric field between the top electrode 301 and the bottom electrode 302, thereby driving all of the black pigment to the viewing surface. (See FIG. 1). The display 300 can be flipped to a white state, as shown in FIG. 5B, by providing an electric field of the same magnitude but having the opposite polarity. With the application of an N50 magnet to the medium 305 in the black state, the black magneto-electrophoretic pigment 322 is chained together allowing a viewer to see the white pigment 321 through the chained black magneto-electrophoretic pigment 322 as shown in FIG. 5C. While the contrast ratio between FIG. 5A and FIG. 5B is clearly better, the contrast ratio between FIG. 5A and FIG. 5C is greater than 10, and certainly sufficient for a writing medium. It should be noted that it is also possible to write from the state of FIG. 5B (white state) with a magnetic stylus 308, using the same magneto-electrophoretic medium, but the resulting gray state looks different from FIG. 5C, as shown in FIG. 5D. The difference between FIGS. 5C and 5D is likely due to the increased amount of white pigment 321 that is toward the viewing surface after the black magneto-electrophoretic pigment 322 is chained together and moved toward the view surface by the magnetic field.

Figure 6:
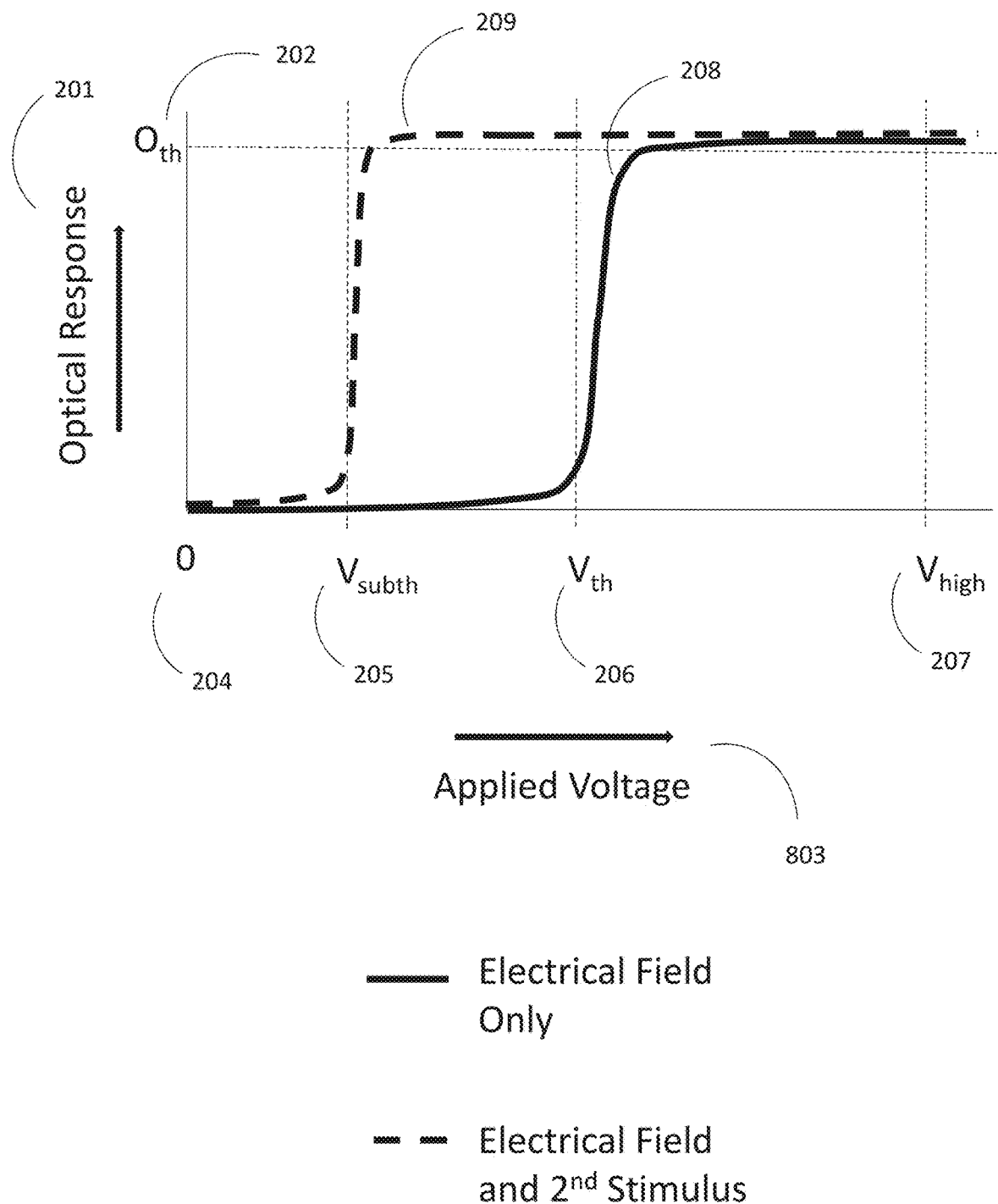
FIG. 6 illustrates the general principle of subthreshold addressing and erasing.

Providing localized erase in a magneto-electrophoretic medium is not as straightforward as providing localized addressing, however, because the black magneto-electrophoretic pigment 322 cannot be simply unchained with a magnet having an opposite polarity. Rather a combination of a subthreshold electric field and a second, non-electrical stimulus is required to return the medium 305 to its original state, as illustrated in FIG. 6. That is, returning the display of FIG. 3 back to the display state of FIG. 1 requires a combination of two (or more) stimuli. As shown in FIG. 6, the electrophoretic switching profile of the black magneto-electrophoretic pigment 322 looks like the dark black line (208) in that it does not move toward the viewing surface until an electrical threshold Vth (206) is reached. This is the mechanism by which a global erase waveform returns the chained black magneto-electrophoretic pigment 322 to its unchained state. Furthermore, if the display 300 included localized back electrodes, such as in an active matrix array, it would be possible to locally return the black magneto-electrophoretic pigment 322 to its unchained state with only electric fields.

However, when a simple device is constructed with continuous front and back electrodes, the only way to return the black magneto-electrophoretic pigment 322 to its unchained state locally without disturbing the chained state of nearby writing is to provide an subthreshold voltage $V_{subth}$ (205) while stimulating the break-up of the chained particles with a second stimulus, such as a lower-strength magnetic field, ultrasound, heat, or light.

In addition to subthreshold erasing, it is also possible to subthreshold address a magneto-electrophoretic medium by providing a subthreshold electric stimulus in combination with a second stimulus, such as magnet, heat, light, ultrasound, etc. For example, an oppositely-charged pigment may be caused to move to the viewing surface by the subthreshold field once the stable pigment dispersion is disrupted by a second stimulus. Additionally, in some embodiments, a black magneto-electrophoretic pigment, previously positioned below a white non-magnetic pigment can be brought to the viewing surface with a combination of a subthreshold electric field and a magnetic stimulus. Such a system provides improved black on white magnetic writing.

The second stimulus may be applied externally using a stylus, a print-head or other similar device. The externally applied second stimulus may be generated from a single source; for example but not limited to, an infrared diode for thermal, a laser diode for light, a contact pad for pressure, or a permanent magnet for magnetic. In another aspect of the present invention, a second stimulus may be generated from a plurality of sources, including but not limited to, an array of diodes for generating heat or light, multiple contact pads for pressure or multiple magnets. Alternatively, a second stimulus may be generated or applied internally. When applied internally, the display may have another layer of material to generate the second stimulus. A second stimulus generating layer may be comprised of an array of electrically controllable sources; for example, heaters for thermal, LEDs for light and piezo for pressure. A second stimulus generating layer may be incorporated into the display as an additional layer or may be incorporated into a pre-existing layer, such as the backplane. If a second stimulus generating layer is light transmissive, this layer may be disposed between the electro-optic layer and the viewing surface. If a second stimulus generating layer is not light transmissive, this layer will be disposed away from the viewing surface and behind the electro-optic layer.

A photo-sensitive material layer may be any suitable material that becomes more conductive when exposed to light of a particular wavelength and/or intensity, which is inherent in the material characteristics and materials are selected accordingly. The material should have sufficient resistivity, such that, the display is not optically responsive when a sub-threshold voltage is applied without light, and sufficient conductivity, such that, the display is optically responsive when a sub-threshold electrical field is applied in conjunction with light. Even though the resistance of the photoconductor is high, applying a high voltage (i.e., a voltage above the threshold) ensures that sufficient field develops across the ink layer and the device switches or optically responds as a whole. As such, a display may be addressed globally by applying a large voltage across it (i.e., a voltage above the threshold).

Photo-sensitive materials with these characteristics are known in the art, such as organic photoconductor films used in laser printing and commercially manufactured. If the photo-responsive material is light transmissive, it may be located in front of the electro-optic layer adjacent the front electrode and closer to the viewing surface. If the photo-responsive material is not light transmissive, it may be located below the electro-optic layer, closer to the back electrode. Thermally-sensitive material layer may be any suitable material that becomes more conductive when exposed to heat. The material should have sufficient resistivity without heat, such that the display is optically non-responsive when a sub-threshold voltage is applied without heat, but sufficient conductivity with heat, such that the display is optically responsive when the sub-threshold electrical field is applied in the presence of heat. Such materials include polymers having conductivities tied to their transition glass temperatures or including conductive materials that can more easily migrate above a set temperature, such as polyurethanes.

A preferred method for providing a second stimulus is to provide a second magnetic field that is smaller than the magnetic field required to address the medium. Such a field may be, for example, between 10 Gauss and 500 Gauss, for example between 20 Gauss and 100 Gauss. This can be provided by a ferrite magnet, a neodymium magnet, or striped pole magnets, such as are commercially available for use in, e.g., magnetic appliques and refrigerator magnets (Magnum Magnetics, Marietta, Ohio). Such field strengths can also be provided by physically separating a strong magnet from the magneto-electrophoretic medium with an intervening non-magnetic material such as wood or plastic, such that the fields at the magneto-electrophoretic medium are insufficient to address the medium but sufficient to disturb chained particles in the presence of a subthreshold electric field.

Figure 7:
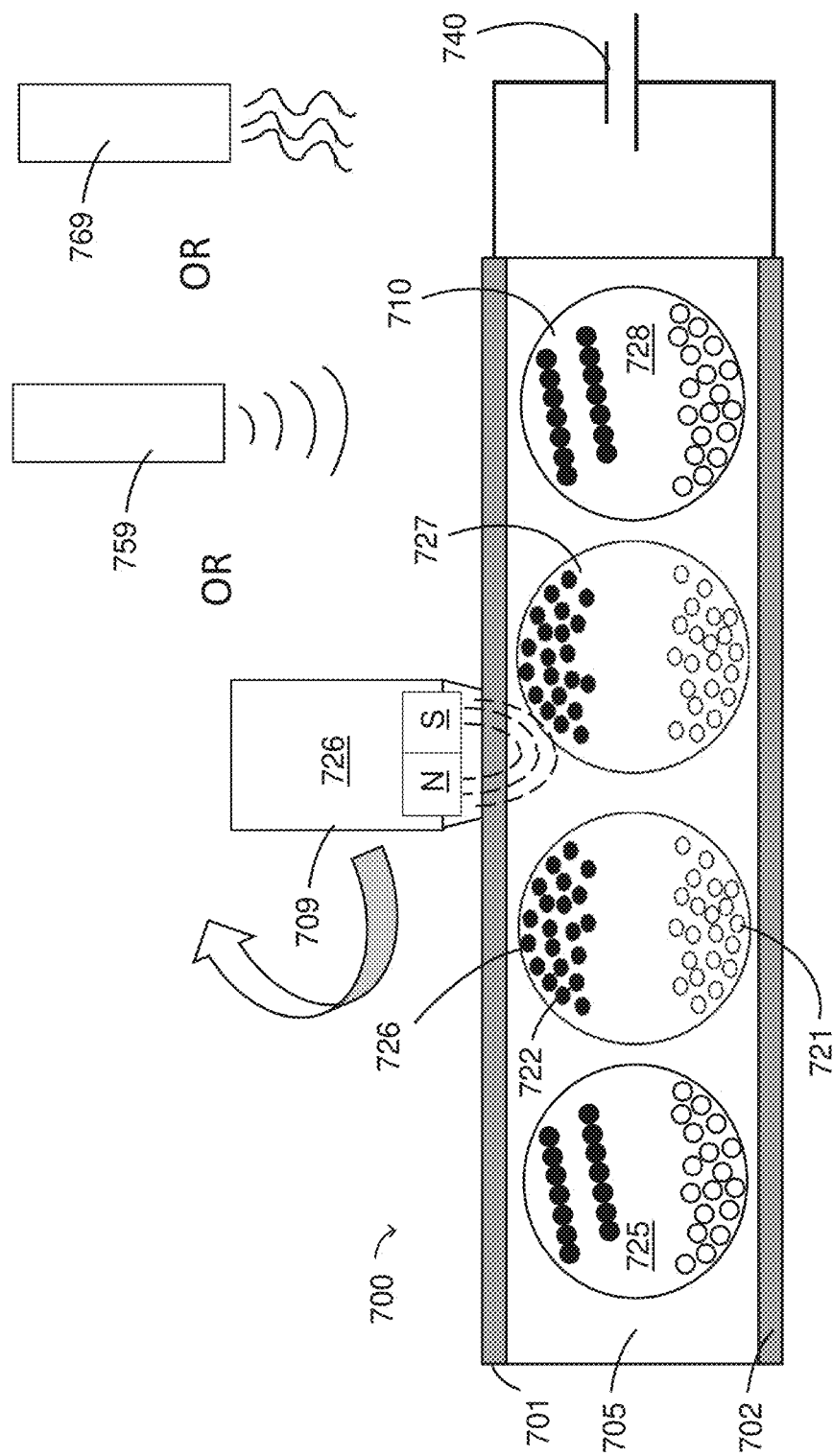
FIG. 7 is a schematic drawing depicting local erasing of a chained magnetic state of an encapsulated magneto-electrophoretic medium comprising black magneto-electrophoretic particles and white non-magnetic electrophoretic particles. A subthreshold electric field is applied while the changed state is disturbed by a non-electric stimulus, e.g., a magnetic field, heat, light, or ultrasound.

FIG. 7 illustrates the process of locally erasing chained black magneto-electrophoretic pigment 722 with a combination of a subthreshold electric field and a second stimulus. Like before, display 700 includes white reflective pigment particles 721 that do not respond to a magnetic field, and black pigment particles 722 that form chains in the presence of a magnetic field. (See FIG. 3) As shown in FIG. 7, a magnetic eraser 709 produces a magnetic field that disturbs the chained black magneto-electrophoretic pigment particles 722, thereby allowing them to be moved toward the viewing surface by the subthreshold field provided by controller 740. As shown in FIG. 7, magnetic eraser 709 includes a striped pole magnet, which produces a tight-looping magnetic field in contrast to the broad magnetic field of a typical pole magnet. As the magnetic eraser 709 is moved back and forth, the field lines disrupt the chained black pigment particles 722, thus allowing the charged black pigment particles 722 to move toward the viewing surface. The magnetic eraser 709 may be of any size or shape including rectangular, triangular, circular or a long narrow strip equal to the width of the display. The size and shape of the magnetic eraser 709 differ based on the area to be erased. The magnetic eraser 709 is not limited to a striped pole magnet as shown in FIG. 7, but it may be a conventional poled magnet, a horseshoe magnet, an electromagnet, etc. In alternative embodiments, the magnetic eraser 709 can be replaced with an ultrasound eraser 759 or a thermal eraser 769. The ultrasound erase directly stimulates the chained black magneto-electrophoretic pigment particles 722 with sound waves, while the thermal eraser 769 alters the viscosity and/or conductivity of the magneto-electrophoretic fluid or the binder or the adhesive layer(s) of the display 700. Thus, as shown in FIG. 7, capsules 726 and 727 are returned to an original dark state, which the surrounding capsules (725 and 728) retain their "written" state.

As shown in FIG. 7, the additional stimulus of using a weak magnetic field to a localized area to be erased breaks up the pigment structure enough to allow the lower electric field to drive the state back to the black background state in a reasonable time ~1 second. In order to achieve this type of local erasing, the magnetic eraser 709 must not appreciably change the areas that had not been stylus addressed to the lighter (gray/white) but remained in the background black color. If the magnetic writing stylus (e.g., 1000-2000 Gauss) was used, the stronger magnetic field would chain the black magneto-electrophoretic pigment 722, and even with the addition of a low electric field a "stylus gray" would be left wherever the magnet eraser 709 was in close proximity to magneto-electrophoretic medium. Accordingly, the erasing stylus needs to be much weaker; e.g., between 10 and 500 Gauss, e.g., between 50 and 200 Gauss. Such magnetic fields are easily achieved with striped N/S poled magnets, such as flexible refrigerator magnets.

Figure 8:
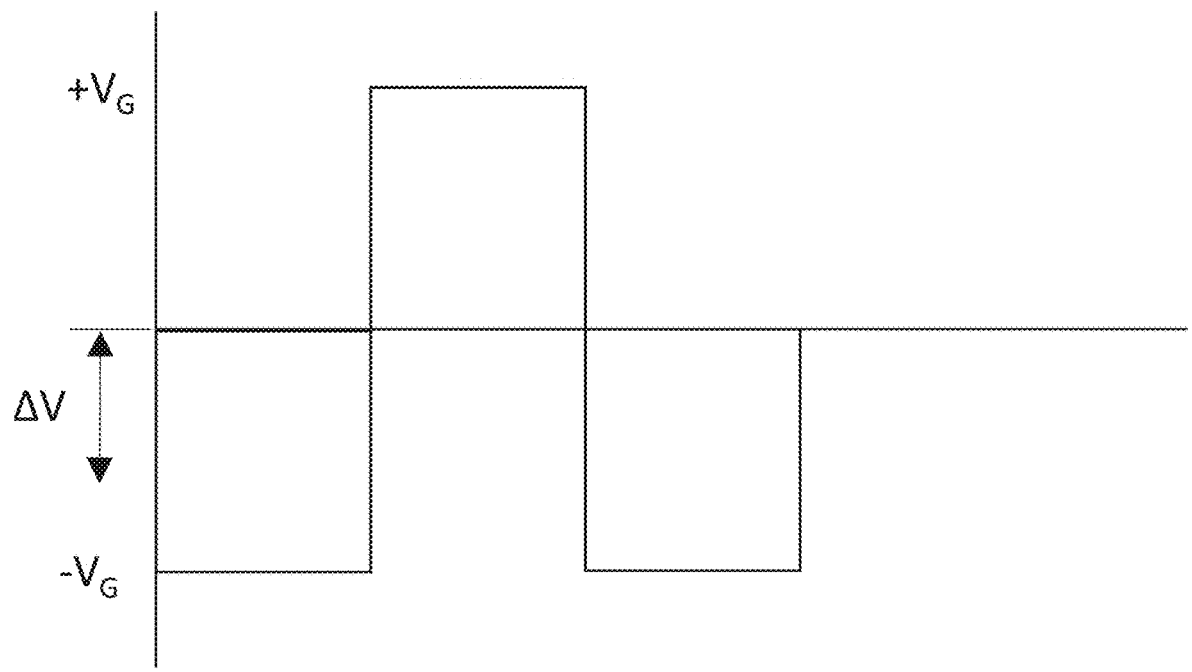
FIG. 8 is an embodiment of a global erase waveform that will drive the black pigment to a viewing surface.
Figure 9:
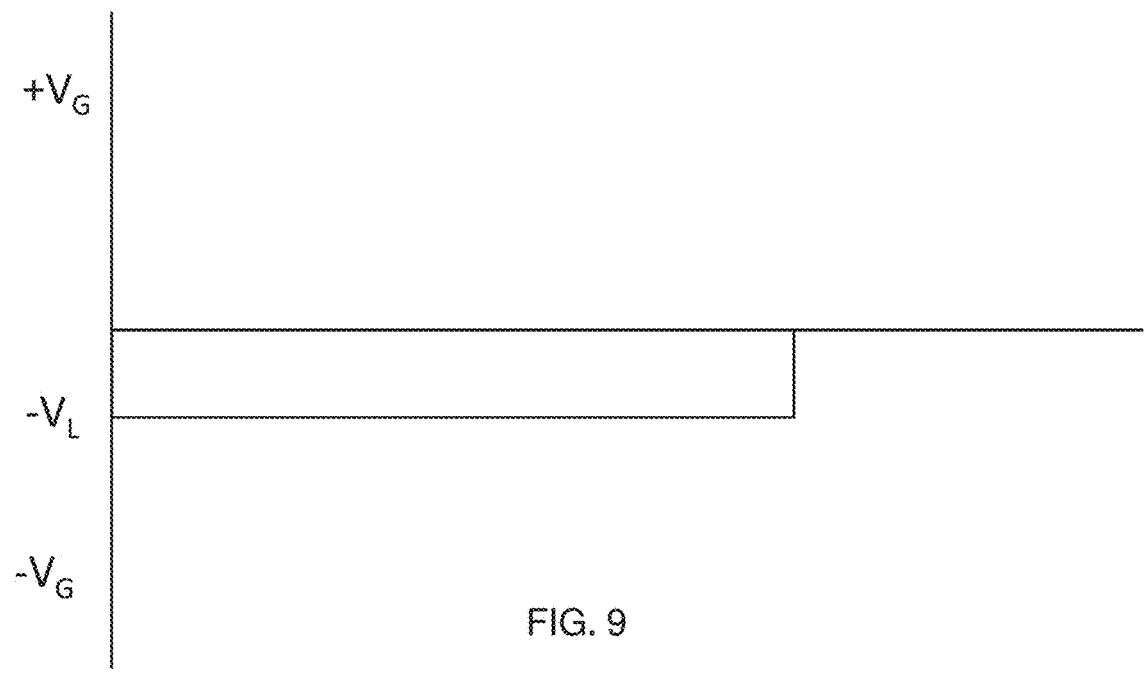
FIG. 9 is an embodiment of a (subthreshold) local erase waveform that will drive the black pigment to a viewing surface when an additional non-electrical stimulus is presented to the magneto-electrophoretic medium.

The difference between global update waveforms (FIG. 8) and subthreshold waveforms for local erase (FIG. 9) can be appreciated by comparing FIGS. 8 and 9. A simple global update pulse, shown in FIG. 8, is typically +/−30 Volts (sometimes +/−15 Volts) in order to drive the white and black particles to the extremes of the capsule walls and produce good separation between the oppositely charged pigments. The global address voltage $V_G$ may be larger or smaller than 30 Volts and it may be offset from zero volts, by some amount $\Delta V$. In contrast, the subthreshold pulse voltage $V_L$ is typically only as high as ⅓ of the global address voltage, $V_G$. That is $V_L$ is typically smaller or equal to $V_G/3$. A very simple subthreshold waveform is shown in FIG. 9. Using a local address (subthreshold) voltage greater than ⅓ of the global address voltage can cause switching transients after the electrical signal is turned off, such as self-erasing and self-addressing. Typically, DC voltages as low as 2.2-3V magnitude can be used with a magnetic eraser stylus for successful local erasing. The subthreshold address pulse of FIG. 9 merely provides a constant electric potential to push, e.g., the black magneto-electrophoretic particles, toward the viewing surface, thus, after the chained particles are disturbed by the second stimulus they will begin to move toward their original position.

Figure 10:
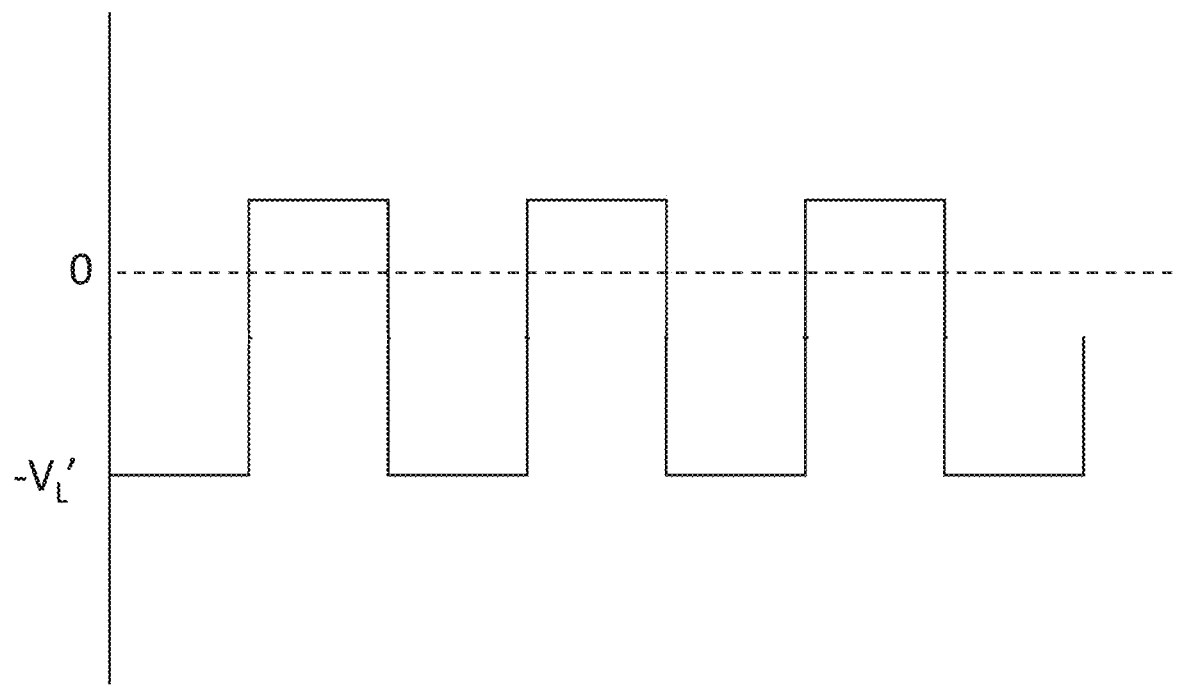
FIG. 10 is an embodiment of a (subthreshold) local erase waveform that will drive the black pigment to a viewing surface when an additional non-electrical stimulus is presented to the magneto-electrophoretic medium. The waveform of FIG. 10 has a duty cycle of approximately 50%.
Figure 11:
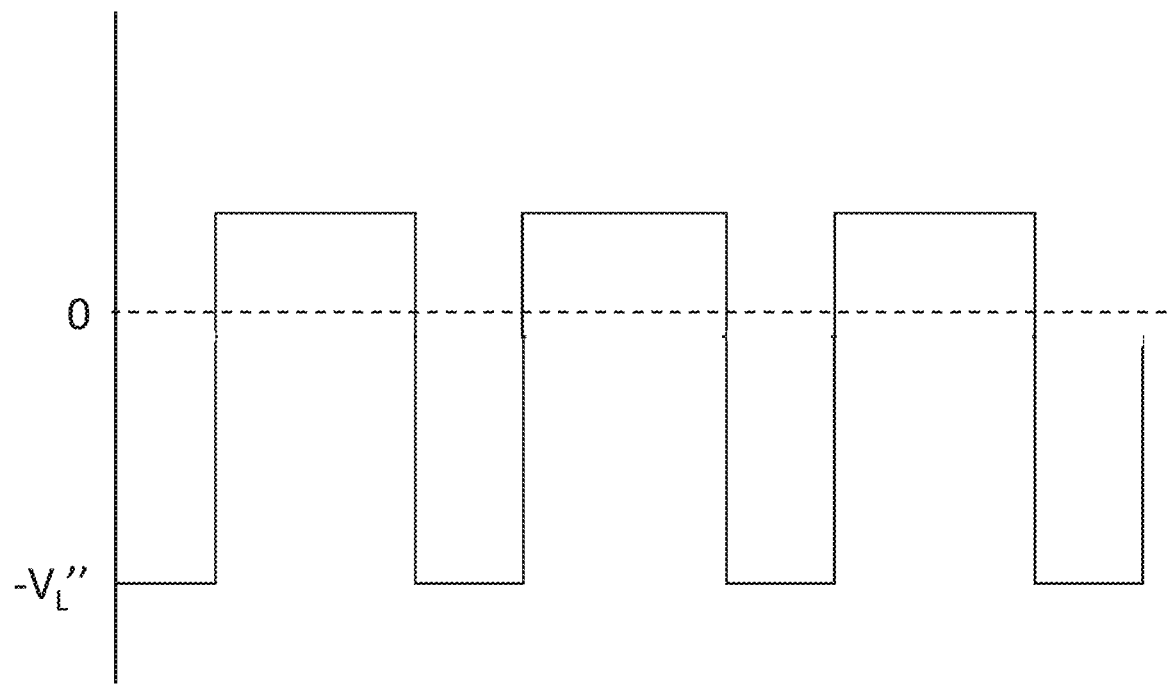
FIG. 11 is an embodiment of a (subthreshold) local erase waveform that will drive the black pigment to a viewing surface when an additional non-electrical stimulus is presented to the magneto-electrophoretic medium. The waveform of FIG. 11 has a duty cycle of less than 50% and results in less remnant voltage build-up across the display medium.

As an alternative to FIG. 9, more complex low-voltage pulse sequences can be used to provide subthreshold addressing, as illustrated in FIGS. 10 and 11. The waveforms of FIGS. 10 and 11 provide better erasing performance in that they preserve the previously-written images in areas that the magnetic eraser does not touch while also maintaining the full black background color in areas the magnetic eraser does touch. Additionally, there is very little self-addressing (unexpected re-appearance of previously addressed images, or random appearance of images). In some embodiments, these (subthreshold) local erase waveforms include a DC. In some embodiments these (subthreshold) local erase waveforms include AC sequences. In some embodiments, such as illustrated in FIG. 10, the off/on duty cycle is 50%. In other embodiments, the duty cycle is less than 50%. In other embodiments, the duty cycle is greater than 50%. For example, a low voltage AC (100 Hz) square wave with 4V peak-to-peak (2V Amplitude) and a −8V DC offset can provide good erasing performance in conjunction with a 200 Gauss magnet. In general, frequencies between 30 and 500 Hz provide the best subthreshold addressing, for example, between 50 and 300 Hz, for example between 75 and 200 Hz, for example between 90 and 120 Hz. The amplitude of the subthreshold waveform is typically greater than 1 Volt and less than 10 Volts, for example 2V, 3V, 4V, 5V, 6V, or 7V. When used, the offset is typically less than +10 and greater than −10V, for example, less than +8V, less than +5V, less than +4V, less than +3V, less than +2V. For example, the offset may be greater than −8V, greater than −5V, greater than −4V, greater than −3V, greater than −2V.

In some embodiments, the duration of the subthreshold pulse is short because if the magneto-electrophoretic medium is subthreshold addressed for more than a couple of seconds the magneto-electrophoretic medium begins to change state due to accumulated voltage (also known as remnant voltage). Accordingly, it can be advantageous to use a lower voltage amplitude to provide longer erasing times without the risk of starting to address the ink with the field alone. Pulse sequences were developed to find the lower end of voltages that could produce the local erasing. Such addressing pulses may be, for example, 3V peak-to-peak (1.5V amplitude) at 100 Hz and −1.5V DC offset. In some embodiments, duty cycles of less than 50% (off/on) can be advantageous to reducing the total impulse and remnant voltage build-up. An example of this type of driving sequence that works for local erasing in combination with the erasing magnetic stylus is as follows: 100 Hz, 1.5 Ampl, −6V offset, 20% duty cycle. Other examples include a 3V peak-to-peak (1.5V amplitude) waveform at 100 Hz and +1.0 V DC offset.

It has been discovered through experiment that the local erase functionality of a magneto-electrophoretic display is diminished when the magneto-electrophoretic has excess accumulated voltage (e.g., remnant voltage in excess of 0.3V, e.g., remnant voltage in excess of 0.5V, e.g., remnant voltage in excess of 1.0V). In particular, in the presence of excess remnant voltage, the locally-erased area of the display does not completely return to the base state, thereby leaving shadows of previous lines, text, etc. While not defining, it is theorized that the excess voltage results from the electrophoretic stack acting as a capacitor during the application of "regular" switching waveforms, i.e., as described above. In the instance where the medium is switched repeatedly over a short amount of time, this excess voltage buildup can become large enough to interfere with the normal performance of the magneto-electrophoretic medium. Controlling, i.e., dispensing, with this excess voltage, i.e., remnant voltage management, greatly improves the user experience, and allows for a true "local erase" experience in which the area to be erased with the magnetic eraser returns to its initial state while leaving the remaining figures, text, etc. intact. An additional benefit of remnant voltage management is that the magneto-electrophoretic device, itself, tends to have a longer lifetime because the control electronics are not subjected to leakage current as the magneto-electrophoretic material decays the remnant voltage during long periods of non-use.

The term "remnant voltage" is used herein to refer to a persistent or decaying voltage (which also may be referred to as open-circuit electrical potential and is typically measured in volts or millivolts) that may remain in an magneto-electrophoretic display after an addressing pulse (a voltage pulse used to change the optical state of the electro-optic medium) is terminated. Remnant voltage may be measured in a magneto-electrophoretic displays by starting with a sample that has not been switched for a long period of time (e.g. hours or days). A voltmeter is applied across the top and bottom electrodes and a "Base Voltage" reading is measured. An electric field is then applied to the pixel, for example a switching waveform Immediately after the waveform ends, the voltmeter is used to measure the open-circuit potential over a series of periods, and the difference between the measured reading and the original Base Voltage may be the "remnant voltage." In reality, a separate voltage detection circuit is incorporated into the magneto-electrophoretic stack to provide a regular measurement of the remnant voltage. Of course, managing remnant voltage requires additional electronics for measuring the remnant voltage and also for modifying the waveforms to be supplied. Methods for measuring remnant voltage and reducing the waveform using transistor architecture can be found at U.S. Pat. Nos. 8,558,783 and 10,475,396, which are incorporated by reference in their entireties.

Figure 12:
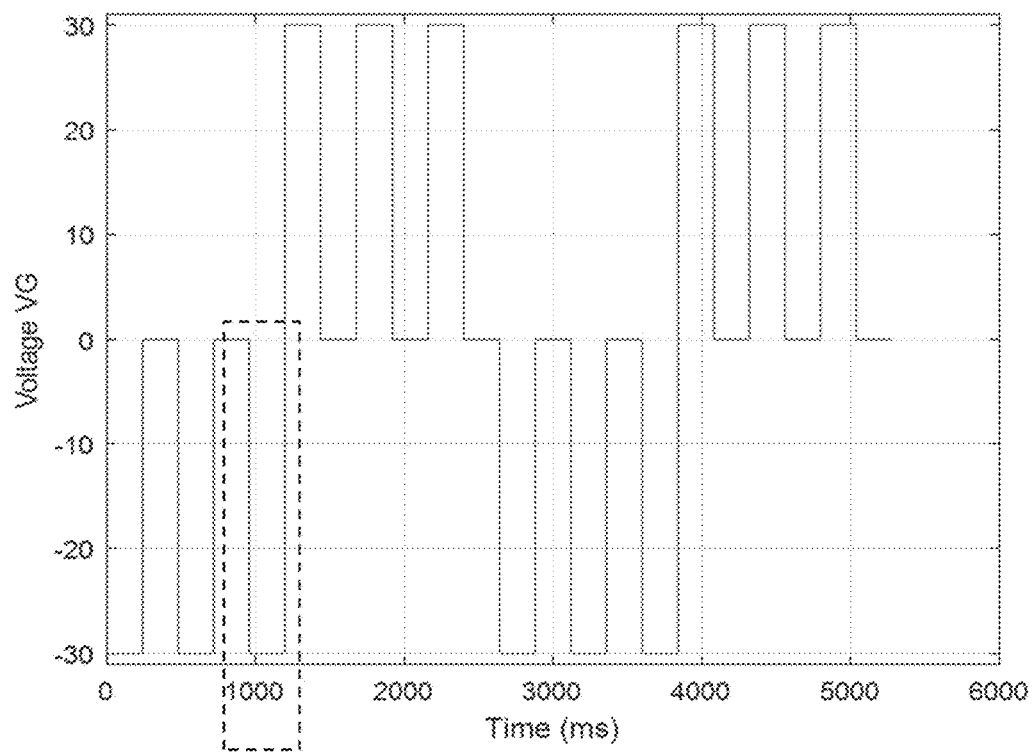
FIG. 12 shows a balanced global erase waveform that is suitable for use with magneto-electrophoretic displays. In some embodiments, the portion of the waveform in the boxed area will be adjusted to diminish the remnant voltage.

Remnant voltage in the magneto-electrophoretic medium can be corrected by modifying global erase waveforms or local erase waveforms, or both. For example, a pre-pulse opposing the remnant may be applied to the global erase waveform to reduce the measured remnant voltage. Alternatively, as shown in FIG. 12 a portion of a balanced global erase waveform can be modified to "pull down" or "pull up" the remnant voltage. As shown in FIG. 12, for a known remnant voltage of 0.3V, modifying the impulse in the boxed area to make the −30V pulse 240 ms longer will actually bring the remnant voltage to zero. Alternatively, one of the +30V pulses could be made 240 ms shorter. This method works for positive and negative remnant voltages.

Figure 13:
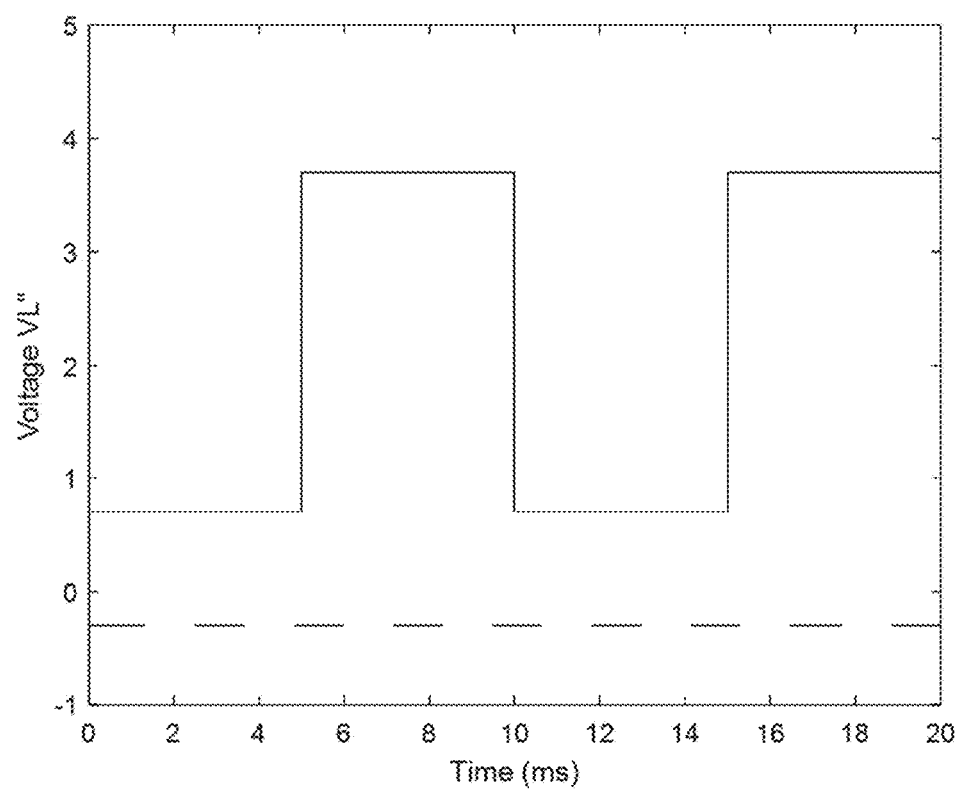
FIG. 13 shows a local erase waveform with a voltage offset suitable for use with magneto-electrophoretic displays. The voltage offset can help to reduce remnant voltage.

Alternatively, or in addition to modifying the global erase waveform, the local erase waveform can be offset by an amount to compensate for the remnant voltage, as shown in FIG. 13. In FIG. 13, the measured remnant voltage (−0.3V)

is represented by the dashed line. Whereas the optimum local erase may be a 100 Hz waveform with a +1V offset and a 3V amplitude, the waveform will be offset to 0.7V, so that the magneto-electrophoretic medium will see, in effect, the optimum waveform. This method works for positive and negative remnant voltages.

It is also possible to fix the remnant voltage during operation of the device by providing a long waveform of a relatively low voltage to counteract the measured remnant voltage. When properly chosen, this long waveform is hardly noticed by a user. This solution may result in greater power consumption by the device, however.

Figure 14A:
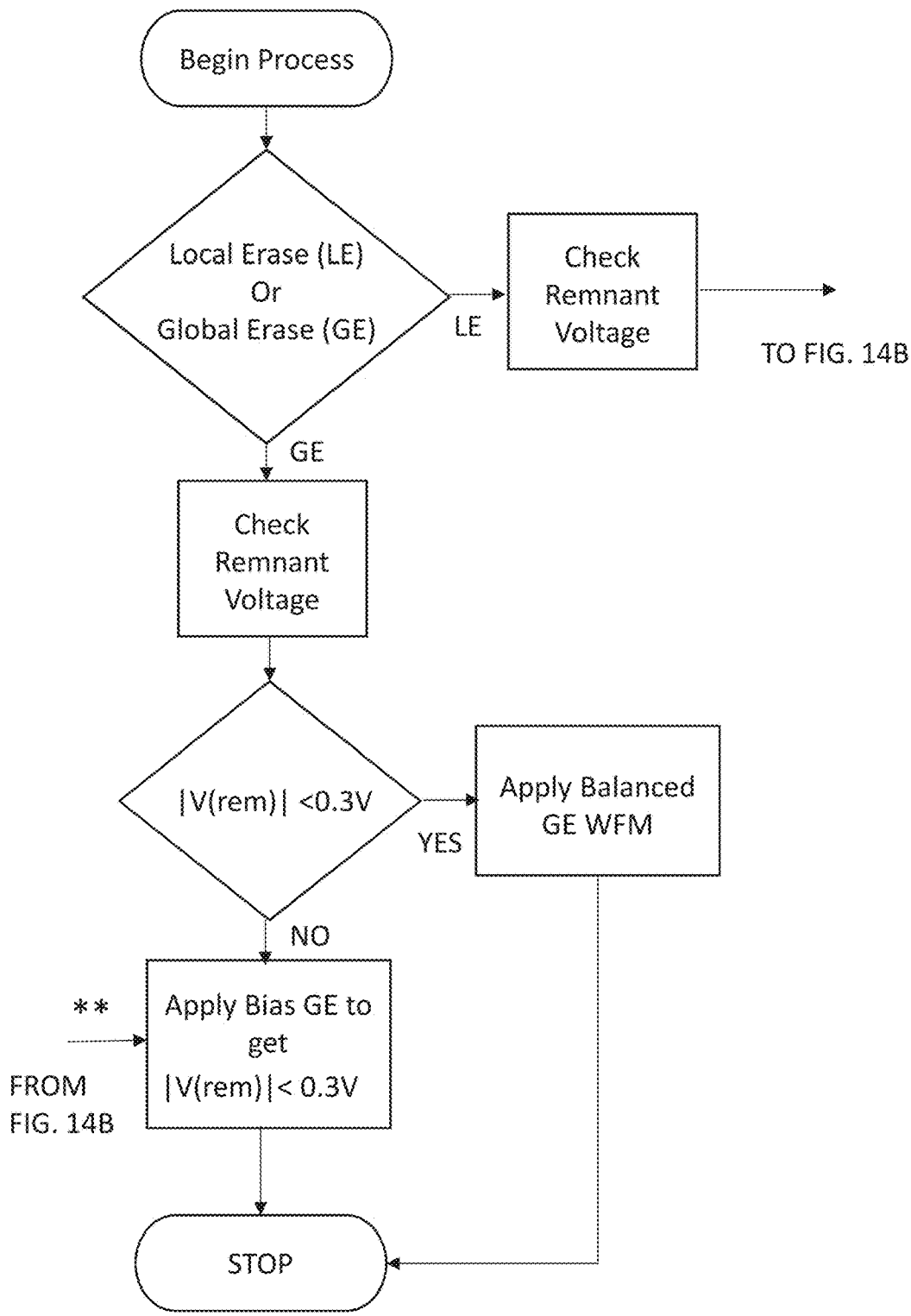
FIGS. 14A and 14B illustrate a flow chart for determining a preferred waveform for driving a magneto-electrophoretic display depending upon how much of the display is to be erased and the amount of remnant voltage present on the magneto-electrophoretic medium.
Figure 14B:
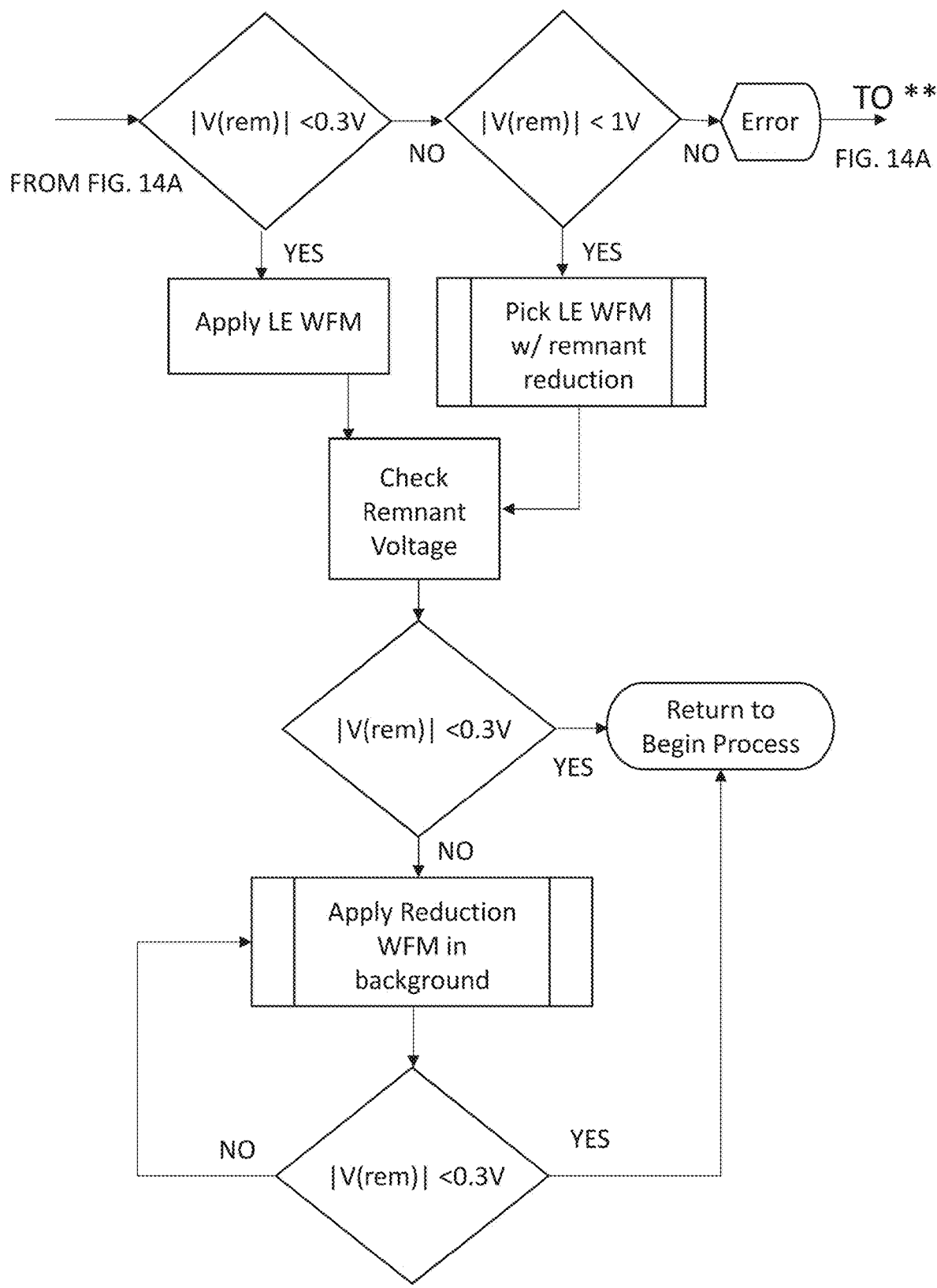

A comprehensive flow chart exemplifying remnant voltage management in a magneto-electrophoretic display having the capability of global and local erase is shown in FIG. 14A and FIG. 14B. Note that FIGS. 14A and 14B form a single flow chart that has been bifurcated for clarity. In particular, the local erase (LE) step of FIG. 14A flows to FIG. 14B, while the error state of FIG. 14B flows back to the bias application step of the global erase in FIG. 14A. The flowchart of FIGS. 14A and 14B should be viewed as merely exemplary as there are many alternative ways to correct for remnant voltage, as discussed above. Furthermore, the remnant voltage thresholds of 0.3V and 1.0V are exemplary, and can be adjusted as needed to improve the performance of the magneto-electrophoretic medium. Additionally, some portions of the flow chart could be removed while having little impact on the user experience.

Noteably, the flowchart of FIGS. 14A and 14B attempts to minimize the remnant voltage by providing opportunities to diminish the remnant voltage during both global erase updates and local erase updates. Only in the event that the absolute value of the remnant voltage exceeds a pre-determined magnitude (e.g., 1V) is the user forced to use a global erase with a bias to return the remnant voltage to zero. It is understood that the ceiling is exemplary and could be made to be, for example, 2V or 5V, etc.

While the magneto-electrophoretic particles described thus far are black ferromagnetic materials such as Bayferrox 318M (Lanxess, Pittsburg, Pa.), it is straightforward to engineer magnetic pigments having the desired charge and color properties for applications in which differently-colored magneto-electrophoretic particles are desired, or multiple types of magneto-electrophoretic particles are desired. See FIG. 15. For example, a composite particle may contain both a strongly magnetic particle/pigment and a non-magnetic particle/pigment. Non-magnetic particles have an extremely low saturation magnetization and/or an extremely low magnetic susceptibility. A composite particle may be constructed to optimize optical and magnetic properties. The magnetic particle may be a small portion of the composite particle. The non-magnetic portion may be scattering or absorbing.

Figure 15:
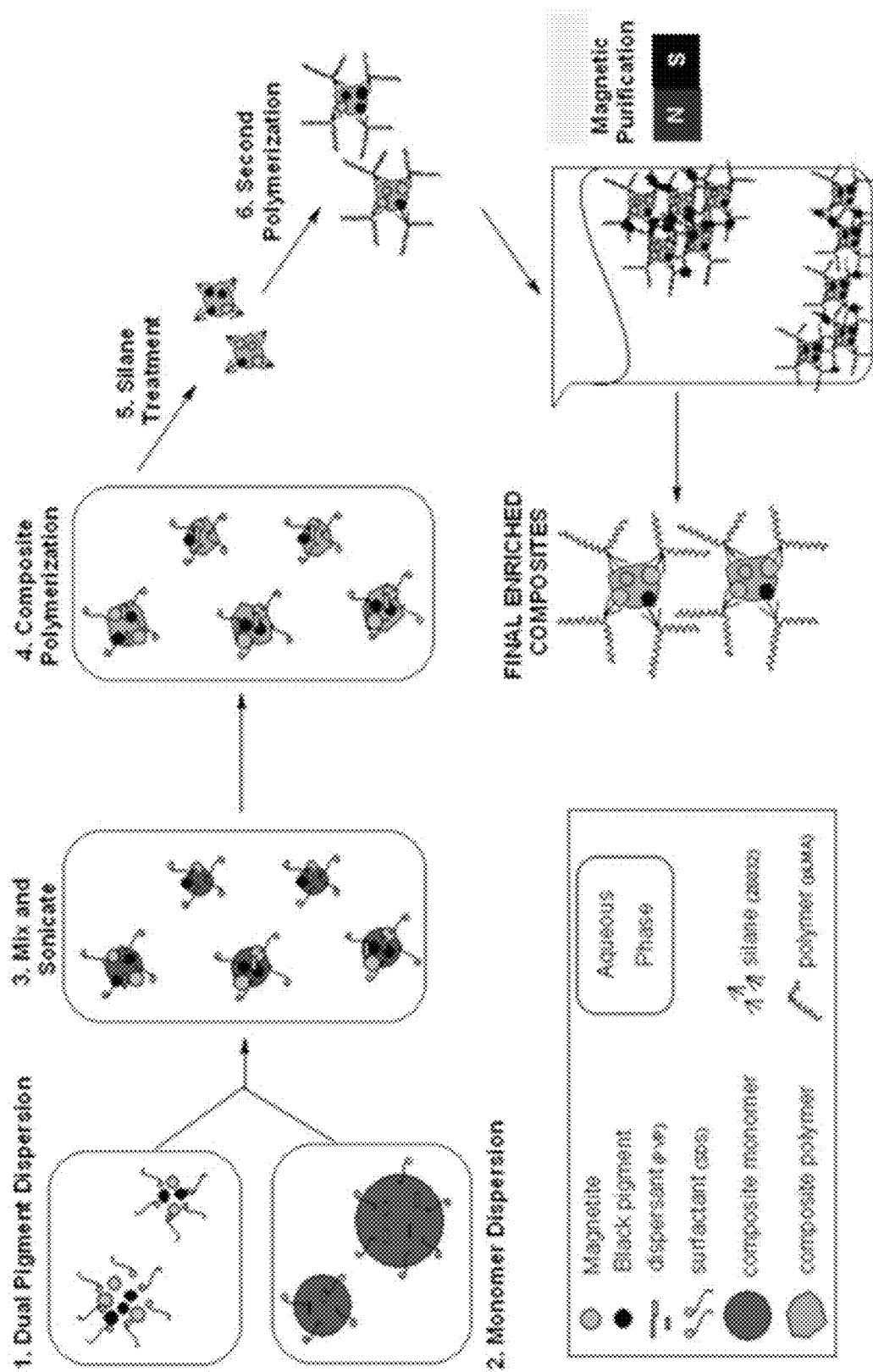
FIG. 15 is a schematic illustration of a method for creating magneto-electrophoretic particles of a desired color and electric charge.

A composite pigment may be synthesized via any of the following methods, which are known in the art: sintering, thermal decomposition, suspension polymerization, dispersion polymerization, emulsion, or mini-emulsion polymerization. A composite particle of targeted levels of magnetization may be made from two pigments, one magnetic and the other non-magnetic via a deficient mini-emulsion polymerization method. In this method the magnetic and non-magnetic pigments are mixed an aqueous dispersion in a first flask, a monomer dispersion is made in a second flask, as shown in FIG. 15. The contents of the two flasks are mixed and sonicated. The resulting mixture is polymerized by heating. The resulting composite polymerization particles are silane treated and then coated with hydrophobic polymer. The surface functionalized magnetic composites are separated via magnetic migration to obtain composite particles of desired levels of magnetization. The magnetic response of the magneto-electrophoretic medium may include three or more pigment particles. For example, the first pigment particles may be magnetic while the second and third (oppositely-charged) pigment particles are non-magnetic. The first and second pigment particles may have the same electrophoretic response while the third pigment particles have a different electrophoretic response compared to the first and second pigment particles. The first and second pigment particles maybe different colors but they may be the same color, and the third pigment particles have a different color compared to the first and second pigment particles.

Figure 16A:
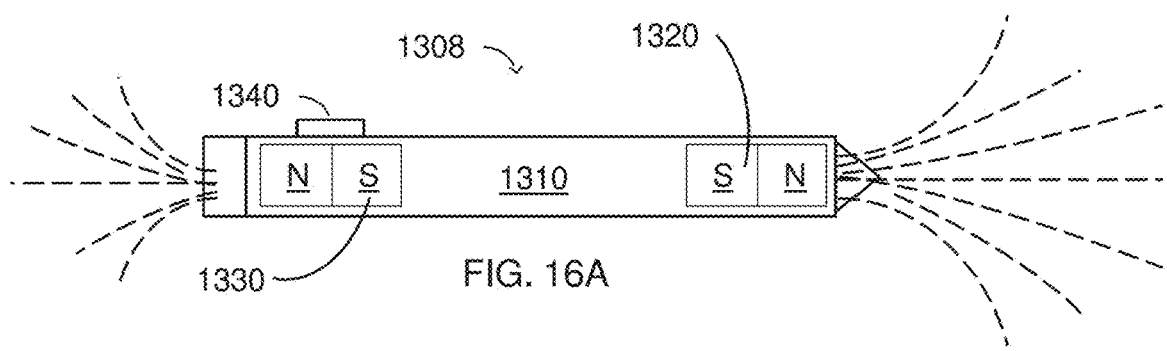
FIG. 16A illustrates a magnetic stylus having a first magnetic end and a second magnetic end, wherein the magnetic field of the first magnetic end is stronger than the magnetic field of the second magnetic end.

As described previously, magneto-electrophoretic media may be addressed with a magnetic stylus 1308, such as depicted in FIG. 16A. The stylus 1308 includes a body 1310 and a first magnet proximal to the first end 1320, which may be a strong neodymium magnet having a magnetic field strength between 500 and 5000 Gauss, for example between 1000 and 2000 Gauss. Such field strengths allow fast natural handwriting at over 10:1 contrast ratio at speeds over 1 m/sec without any of the stylus lag notable for other electronic writing devices that utilize electronic touch screen interfaces. The stylus 1308 may additionally include a second magnet proximal to the second end 1330, which may be a ferrite magnet or a striped pole magnet and have a magnetic field strength between 10 and 500 Gauss, for example between 50 and 200 Gauss. The magnetic stylus 1308 may also include a wireless transmitter (e.g., BLUETOOTH, ZIGBEE, or WIFI) as well as a switch 1340 on the body 1310 of the stylus 1308, operatively connected to the wireless transmitter (not shown in FIG. 16A).

Figure 16B:
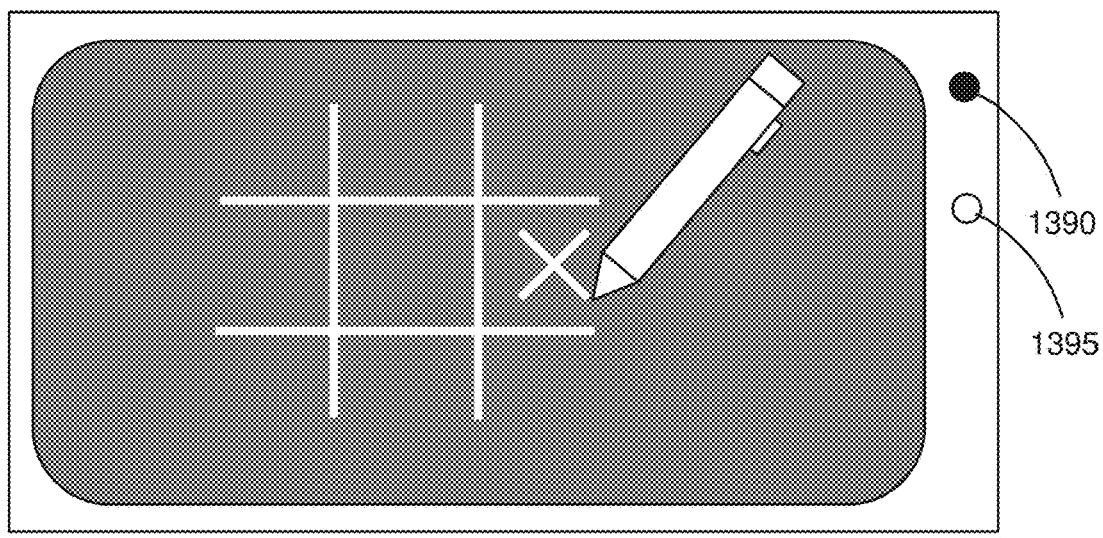
FIG. 16B illustrates use of the stylus of FIG. 16A to address a magneto-electrophoretic display.
Figure 16C:
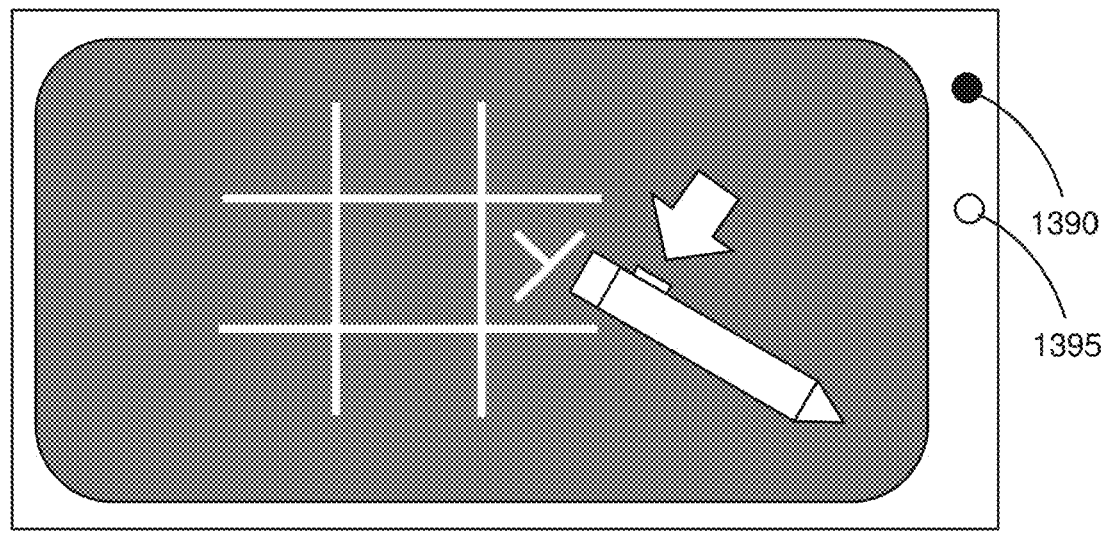
FIG. 16C illustrates use of the stylus of FIG. 16A to erase a magneto-electrophoretic display. By pressing the button on the stylus, a user instructs the controller to provide a subthreshold electric field across the magneto-electrophoretic medium.

When used to address a magneto-electrophoretic display 1375, the stylus 1308 may be used in a manner similar to a pencil or pen, creating lines of text, drawings, etc., where the stylus has been placed. See FIG. 16B. When in this "write" mode, there is no need to supply power to the magneto-electrophoretic display, and the writing will maintain its appearance indefinitely without further power consumption. When it is desired to locally erase a portion of the writing, a user will activate the subthreshold local-addressing (a.k.a. "erase") mode by interacting with the switch 1340, which may be a button, a touch sensor, etc. Alternatively (or in addition), the magneto-electrophoretic display 1375 may include a global erase switch 1390 and/or a local erase switch 1395, thereby causing the controller to provide a suitable waveform, as described above. The global erase may also be activated with a separate switch on the stylus (not shown). Once the wireless transmitter has sent a signal to the voltage controller, the voltage controller will provide a subthreshold voltage waveform to the entire display 1375, as discussed above. See, also, FIG. 18. The user can then cause the image to be locally-erased with the second magnet proximal to the second end 1330, which is weaker than the first magnet proximal to the first end 1320, as illustrated in FIG. 16C.

Figure 17A:
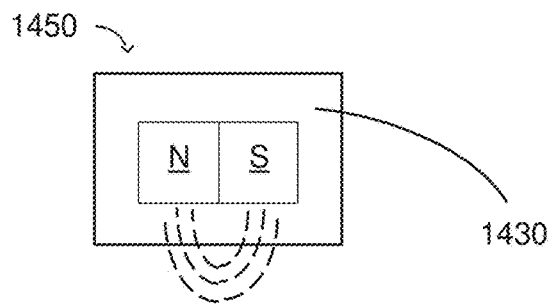
FIG. 17A illustrates a magnetic eraser that can be used with a magneto-electrophoretic display.
Figure 17B:
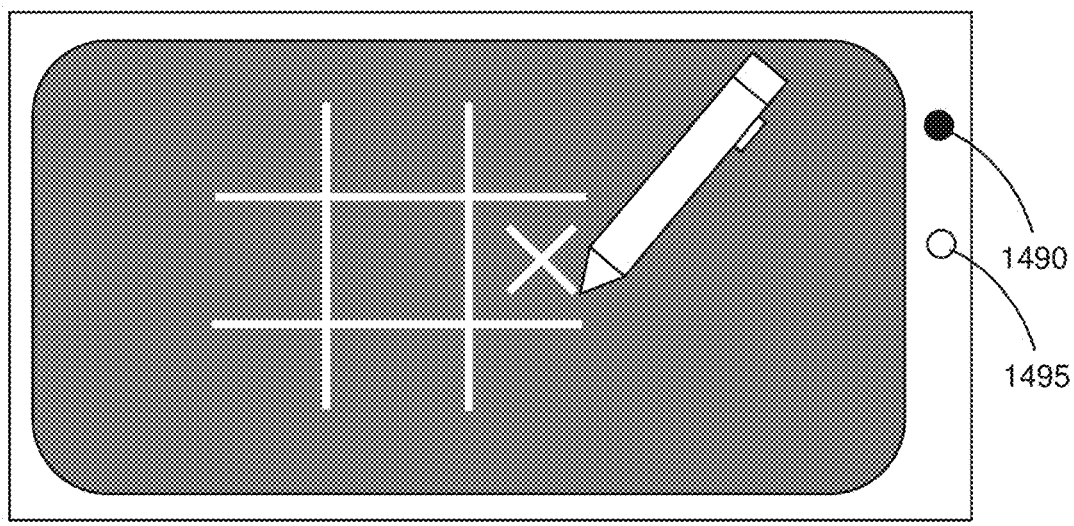
FIG. 17B illustrates use of the stylus of FIG. 16A to address a magneto-electrophoretic display.
Figure 17C:
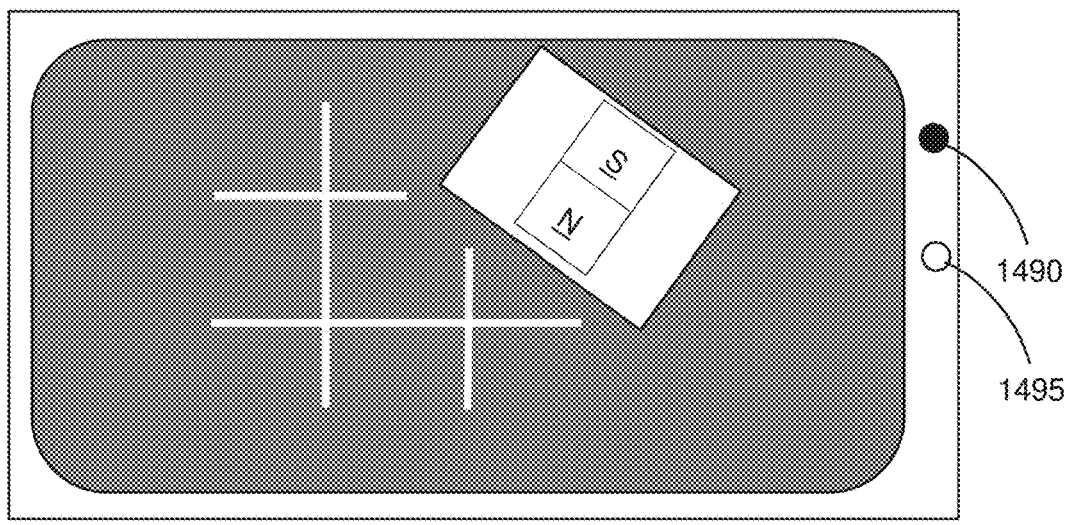
FIG. 17C illustrates use of the eraser of FIG. 17A to erase a magneto-electrophoretic display.

In alternative embodiments, a separate eraser 1450 may be used with a magneto-electrophoretic display 1475, as shown in FIG. 17A. An eraser 1450 may be, for example, a block of wood with a striped pole magnet 1430. Such a magnet 1430 provides a magnetic field strength between 10 and 500 Gauss, for example between 50 and 200 Gauss, at the writing surface. The eraser 1450 may alternatively house a source for a non-magnetic stimulus, such as ultrasound. Accordingly, when a suitable subthreshold local-address field is provided to the magneto-electrophoretic medium, the eraser 1450 will cause only the image in the area proximate to the eraser 1450 to return to its initial state, as shown in FIG. 17C. Like the stylus 1308 of FIG. 16A, the eraser 1450 may also include a switch (not shown) that wirelessly connects to the voltage controller so that an erasing waveform is initiated. Of course, it is also possible that the eraser 1450 (or the stylus 1308) is directly wired to the voltage controller. A direct wiring may be more suitable for sensitive environments, such as hospitals, where it is desirable to reduce sources of radio frequency interference.

Figure 18:
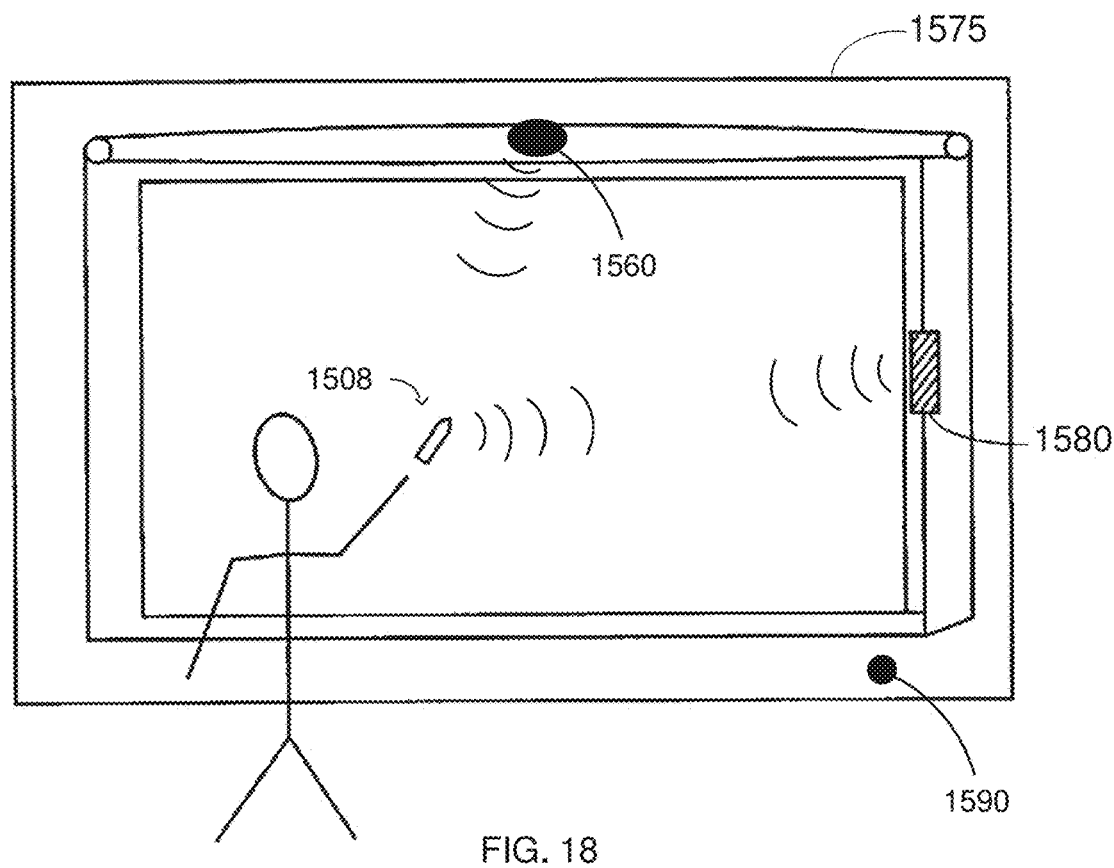
FIG. 18 illustrates wireless communication between a magnetic stylus, such as in FIG. 16A, and a voltage controller that provides dual modes of local and global erase.

Because there is no requirement for an active matrix backplane in magneto-electrophoretic displays, it is quite straightforward to produce a large format magneto-electrophoretic display 1575, such as shown in FIG. 18. Such a display may be greater than 1 $m^2$ in area, for example greater than 10 $m^2$ in area, for example greater than 20 $m^2$ in area, for example greater than 50 $m^2$ in area, for example greater than 100 $m^2$ in area. While it is theoretically possible to produce a kilometer-long magneto-electrophoretic display, large format magneto-electrophoretic displays are typically smaller than 200 $m^2$. Because of the simple construction and the minimal power requirements, a 4 $m^2$ magneto-electrophoretic display can be powered with a rechargeable battery, thus allowing it to be very portable and suitable for installation in settings without utilities. A large format magneto-electrophoretic display 1575 would typically include a wireless receiver 1580 that communicates with a stylus 1508, thereby allowing a user to simply switch into a local erase waveform mode. The large format magneto-electrophoretic display 1575 may also include a global erase button 1590, thus allowing a user to quickly regenerate a clean drawing surface. Because the large format magneto-electrophoretic display 1575 can be constructed from flexible materials, the large format magneto-electrophoretic display 1575 can be installed on non-planar surfaces, such as columns, pipes, and ducts.

In large format displays, such as classroom sized drawing boards, the performance may be improved by employing a segmented backplane with individual traces from the segments to a series of switches that would control which portion of the backplane was to be energized for local erase. In some embodiments, the stylus 1508 may additionally include location sensing functionality such that the stylus 1508 would tell the wireless receiver 1580 where the stylus 1508 was located when the button activating local erase was pushed. Such location sensing can be achieved with an IR sensor 1560, or with an optical sensor on the stylus 1508 that senses a location on the display by recognizing patterns of microdots on the surface of the display, or with a digitizing grid behind the writing surface that senses the location of the magnetic stylus 1508.

EXAMPLES

Example 1

Contrast Ratio as a Function of Writing Speed

A magneto-electrophoretic display system was constructed as described below. See also FIGS. 3 and 7. An electrically-conductive, light-transmissive front substrate was formed from 5 mil PET/ITO OC300 (St. Gobain). A layer of compartmentalized magnetic writable ink media was prepared, including black and white microencapsulated magnetic media, the magnetic internal phase being Bayferrox 318M magnetic black with a Z6032 silane surface treatment and LMA (lauryl methacrylate) polymerization resulted in a positively-charged magnetic black pigment. The non-magnetic white pigment includes titanium dioxide that is negatively charged in Isopar E internal phase fluid with Solsperse 19000 charging agent. After microencapsulation, the microcapsules are blended with cationic PVOH polymer CM-318 binder material coated directly on the first substrate on the clear conductor and dried. The adhesive used for lamination of the microcapsule binder slurry to the backplane is a segmented VRA adhesive. For testing, a backplane was constructed from a 5 mil PET substrate (MELINEX ST504, Tekra, New Berlin, Wis.) coated with a screen printed carbon conductor to create a single switching pixel covering the entire display area. (If desired to create a light-transmissive backplane, the backplane could also be made from PET/ITO OC300 as described above). The stack received a mechanical protection layer to prevent damage front conductor and capsule layer. (Thin glass has also been utilized which provides much more mechanical protection from the stylus but whose added thickness hinders the performance of the stylus.) Two trace electrical tails were created for connection to electronics, one trace connecting to the continuous backplane electrode and the other connecting to the continuous front electrode. A voltage driver was coupled between the electrical tails to provide a global erasing pulse of +/−30V, as well as low voltage complex sequences for local erasing. The driver included a microcontroller to control the sequences and was configured to float or ground the waveform at the end of driving pulses.

A magnetic writing stylus was constructed from a permanent magnet in a holder shaped like a pen with a 2 mm wide N50 cylindrical magnet in a plastic holder made to resemble a mechanical pencil. (The literature strength of the magnet is 1000-2000 Gauss at the magnet surface.) A magnetic eraser/stylus was made from a weaker ferrite magnet that measured 80-200 Gauss at the surface of the magnet. The eraser had a contact surface of about 7 $cm^2$ and included striped N/S poling with about 1-2 mm spacing between poles.

The effect of writing speed on contrast ratio was measured for a magnetic ink similar to that illustrated in FIGS. 5A-5C, in which the electrically-driven white and dark states were 78.4 L* and 15.6 L*, respectively, thereby providing a contrast ratio for a global erase modality of 27:1. As explained previously, the "writing" gray state contrast ratio depends upon the starting state (white or black), and typically has a contrast ratio between 5 and 17.

Figure 19:
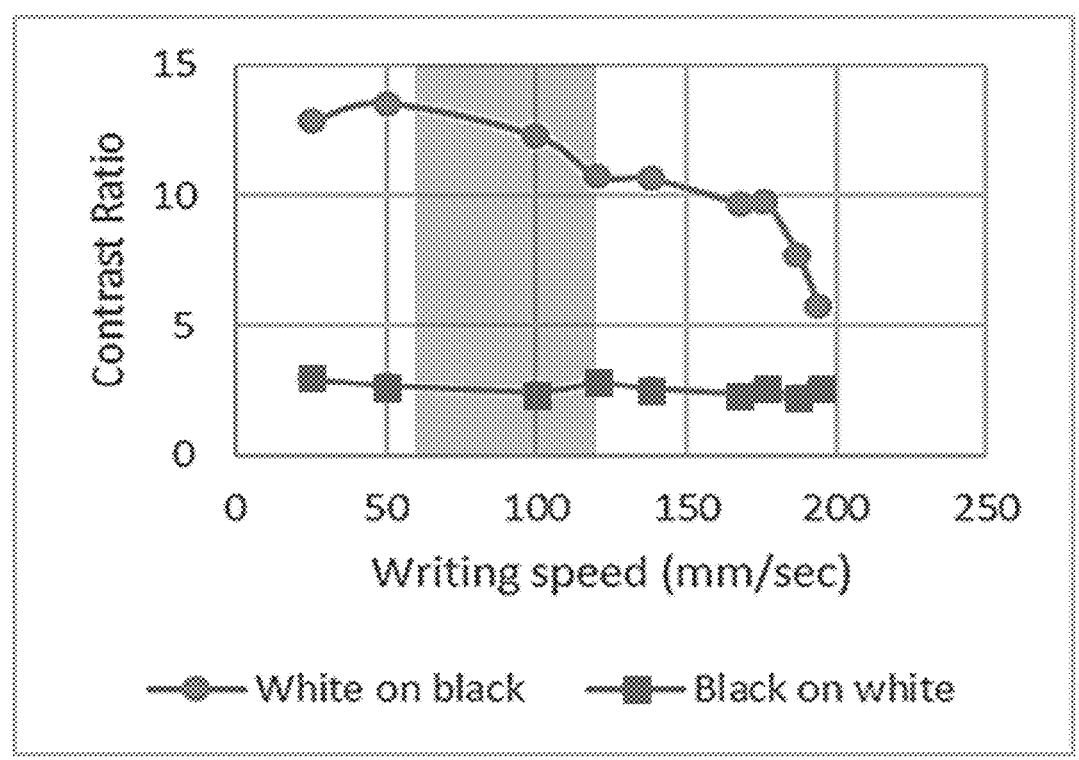
FIG. 19 shows the contrast ratio between the dark and gray states and between the light and gray states in a magneto-electrophoretic display that has been optimized for gray on black writing. At a normal writing speed (shaded box) with a magnetic stylus, there is excellent contrast and no perceptible lag.

To systematically evaluate the relationship between contrast ratio and write speed a magnetic stylus having a magnet of 50 Gauss was coupled to a computer-interfaced traveler that could be programmed for linear movement at a desired rate. The traveler caused the stylus to move over a 500 mm sheet of magneto-electrophoretic display at a given rate and the resulting gray writing state was evaluated for L* using an optics bench having a calibrated light source and standardized reflective surfaces. The effect on contrast ratio of writing with a magnetic stylus at various speeds is shown in FIG. 19. As shown in FIG. 19, there is sufficient contrast to use the magneto-electrophoretic display as a writing device, even at twice a normal writing speed. At very high magnetic stylus speeds the contrast ratio decreases, but these are at speeds higher than those required for normal writing. Different gray shades can be formed by different stylus designs or by adjusting the magnetic field strength by, for example, changing the distance of the stylus tip from the active area (which could be achieved by changing writing pressure using a suitable stylus design) or using an electromagnet with variable current (see below). L* is reflected luminance of the display, where L* has the usual CIE definition:

$L^* = 116(R/R_0)^{1/3} - 16$ where R is the reflectance and $R_0$ is a standard reflectance value.

The response time of magneto-electrophoretic film is so fast that no latency is perceived when writing with a stylus that produces magnetic fields of at least about 30 Gauss at the display surface at speeds of up to 200 mm/second. If lower magnetic fields or faster writing speeds are used, the contrast ratio of the written image is reduced, but there is no temporal lag. In normal handwriting, speeds in the range of 60-120 mm/sec are commonly encountered, although for drawing and shading faster speeds may be required.

Example 2

Variable Linewidth as a Function of Electromagnet Frequency

Figure 20A:
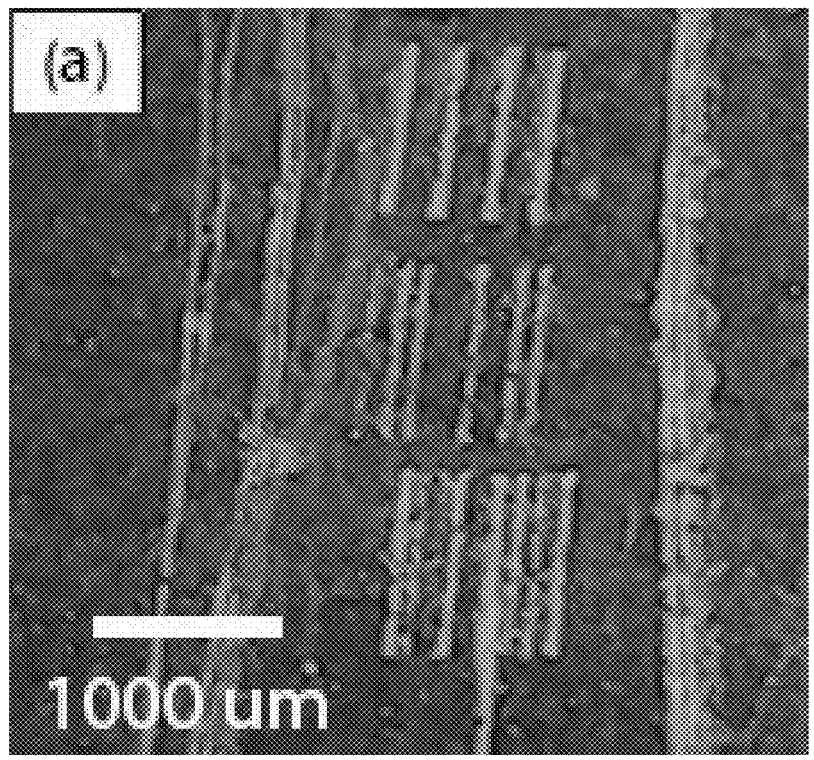
FIG. 20A is a visible light micrograph of addressing a magneto-electrophoretic medium with a variable frequency electromagnet (addressed from behind).
Figure 20B:
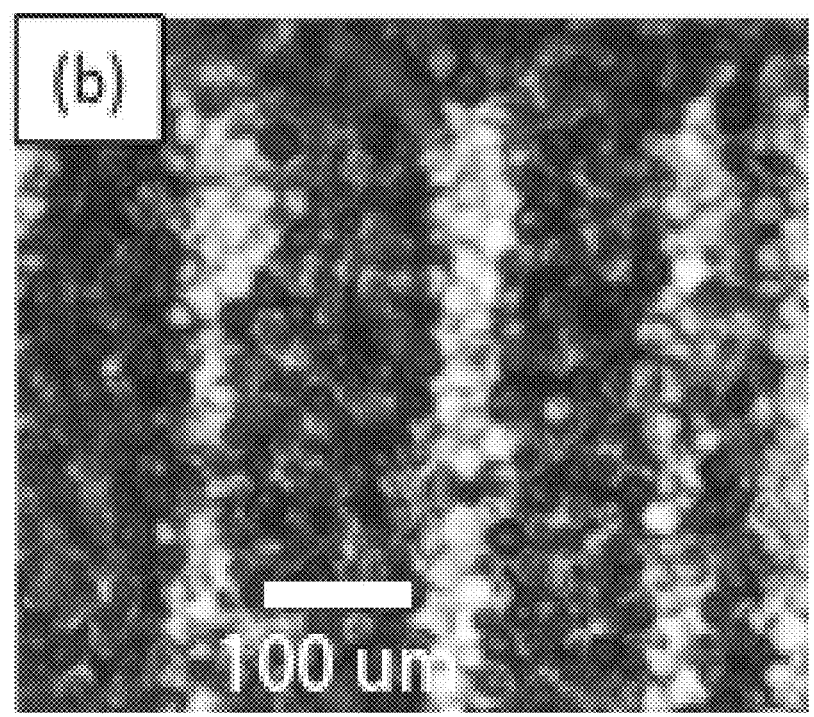
FIG. 20B is a zoomed view of the visible light micrograph of FIG. 20A, showing that it is possible to address a magneto-electrophoretic medium with a variable frequency electromagnet and achieve linewidths nearly one microcapsule wide.
Figure 20C:
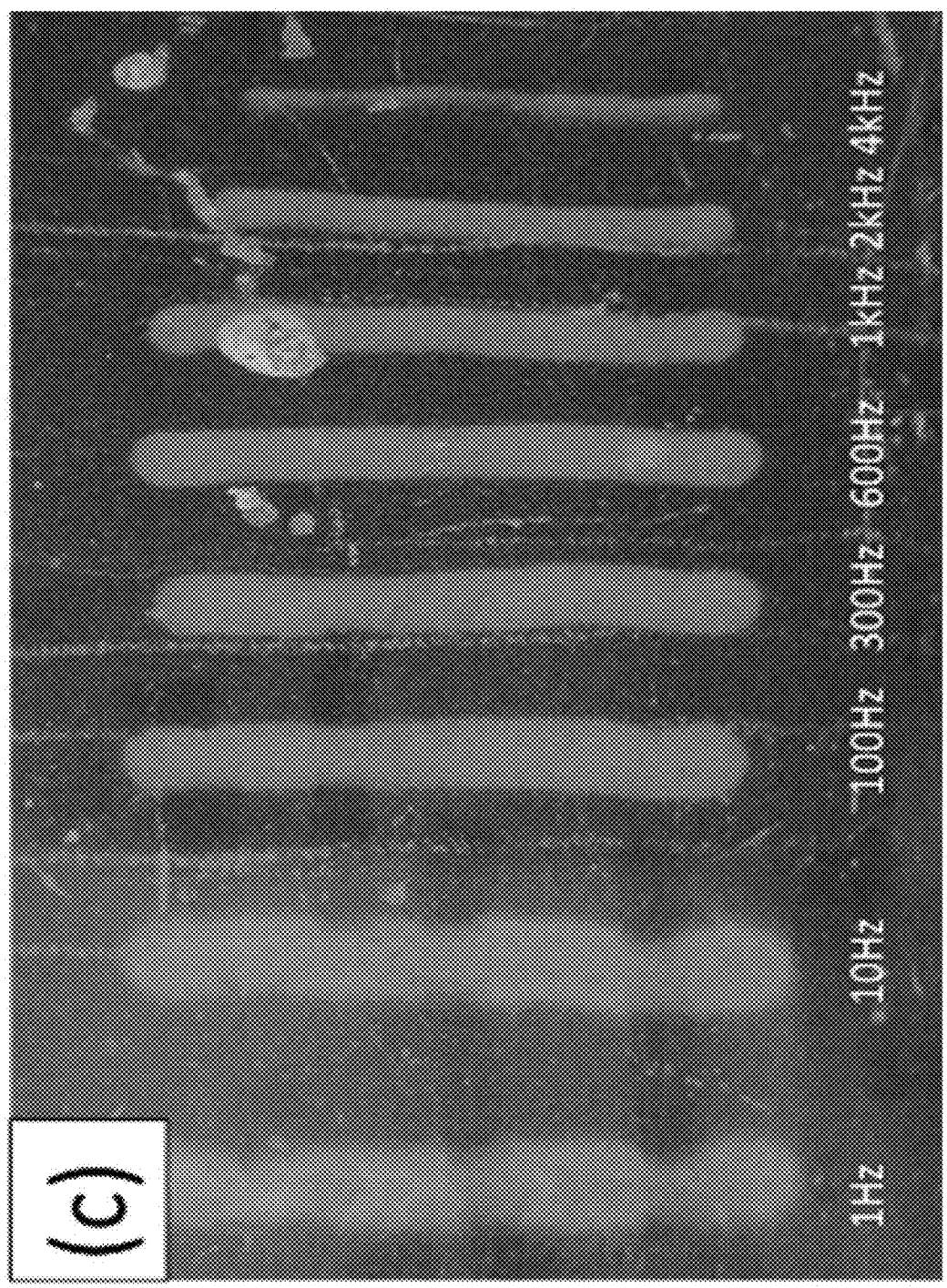
FIG. 20C is a photograph showing variability in the linewidth when writing a magneto-electrophoretic medium with a variable frequency electromagnet.

The magneto-electrophoretic display described above was combined with an electromagnetic stylus connected to a function generator, thereby allowing the amplitude and the frequency of the electric field to be varied. Combinations of electric and magnetic fields that individually would be below the threshold required to switch the display can be used to change the local optical state. Thus, although the purely magnetically-written optical state, illustrated in FIGS. 5A-5C, is a gray state produced by chaining of the black particles, adding an alternating magnetic field component can produce a more extreme optical contrast in the locally written area, as shown in FIGS. 20A-20C. The use of an electromagnetic stylus gives the opportunity to change the applied magnetic field dynamically. For example, by addressing the magneto-electrophoretic medium from behind with an electromagnet, it is possible to create line widths of white on black of 100 μm or smaller. See FIG. 20B. Furthermore changing the frequency of alternating current supplied to an electromagnetic writing head can change the image appearance. FIG. 20C shows this effect, using an electromagnetic writing head that is located adjacent to the underside of the writable film and powered via a function generator. Together, FIGS. 20A-20C suggest that a linear or two-dimensional multi-pixel array magnetic print head could be used to write high resolution images onto a magneto-electrophoretic film without the need of adding the cost of a TFT or multi-segmented backplane. It is also possible that by carefully tuning the electric charge of the magneto-electrophoretic pigment, it would only be possible to address the medium with an electromagnet of a particular frequency, thereby allowing the medium to be written and "locked" from further alteration without a writing head of the appropriate frequency.

Example 3

Preparation of Red Composite Magnetic Particles

Paliotan Red 6475 pigment (BASF) and 50 nm magnetite (Sigma Aldrich) were mixed at a ratio of 1:1 (wt:wt) to make 50 g total pigment premix. The resulting mixture was dispersed at 12.5% wt. in deionized water with 3.46 μM SDS and 1.66 μM $KHCO_3$. The resulting dispersion was mixed with a 2.83% (wt:wt) dispersion in deionized water with 4.25 g of a monomer mixture (76:4:5 (wt:wt:wt) methyl methacrylate: methacrylic acid: divinylbenzene) along with 0.50 g of 2.21 mmol hexadecane and 3.0 g of 40 kDa PVP with 3.46 μM SDS and 1.66 μM $KHCO_3$. The resulting ratio of total pigment to total monomers was 11.76:1 (wt:wt). The dispersion was rolled for 1 hour and bath sonicated for 1 hour. The final mixed monomer and dual pigment dispersion was then added to a jacketed 1 L reactor equipped with an overhead stirrer, stirred vigorously, and heated to 75° C. for 1 hour. While heating, the dispersion was sparged with $N_2(g)$ for the first 45 min, then kept under a blanket of $N_2$ for the remainder of the reaction. Next, 50 mL of a 14.1 μM potassium persulfate (KPS) solution was added to the reaction over 30 min at 1.67 mL/min. The reaction was then stirred at 75° C. for 18 hours. The pigment was diluted to 800 mL in deionized water and centrifuged at 7000×g for 45 min. The pigment pellet was then re-dispersed in 800 mL of ethanol and strong magnets were used to immobilize the magnetic particles against the floor of the flask while the remaining colored ethanol was decanted. The resulting pigment cake was then dried at 70° C. in a vacuum oven for 18-24 hours. The resulting red magnetic pigment was incorporated into a magneto-electrophoretic display as described in Example 1. The display was addressable with a magnetic stylus, however because the starting state was white (see FIG. 5B) the stylus writing appeared as pink (intermediate between white and a "dark" state that was red) analogous to the writing state of FIG. 5D.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A method for erasing a magneto-electrophoretic medium including magneto-electrophoretic particles, the method comprising:
    applying a non-electric field stimulus to the magneto-electrophoretic medium and simultaneously applying a sub-threshold voltage to the magneto-electrophoretic medium, thereby causing the magneto-electrophoretic medium to switch from a first state to a second state, wherein the first state and the second state differ by at least 10 L*, wherein L* is reflected luminance of the display, where L* has the usual CIE definition:
    $L^* = 116(R/R_0)^{1/3} - 16$,
    where R is the reflectance and $R_0$ is a standard reflectance value,
    wherein the sub-threshold voltage is greater than zero but insufficient alone to cause the magneto-electric medium to switch from the first state to the second state within five seconds, and wherein the non-electric field stimulus is magnetic, ultrasound, vibration, or heat.

2. The method of claim 1, wherein the non-electric field stimulus is magnetic, and the magnetic stimulus is provided by a stylus that was constructed by a permanent magnet.

3. The method of claim 2, wherein the stylus comprises a magnet providing a field strength between 10 and 1000 Gauss at the surface of the stylus.

4. The method of claim 1, wherein the non-electric field stimulus is magnetic, and the magnetic stimulus is provided by a striped-pole magnetic material.

5. The method of claim 1, wherein the magneto-electrophoretic medium comprises electrically-charged ferromagnetic particles.

6. The method of claim 1, wherein the the sub-threshold voltage is less than one half of a voltage required to cause the magneto-electrophoretic medium to switch from the first state to the second state over a same period.

7. The method of claim 6, wherein the the sub-threshold voltage comprises a time-varying waveform.

8. The method of claim 6, further comprising:
measuring a remnant voltage on the magneto-electrophoretic medium; and
modifying the time-varying waveform to diminish the remnant voltage on the magneto-electrophoretic medium.

9. The method of claim 8, wherein the time-varying waveform is modified by changing an offset of the time-varying waveform, or changing a duty cycle of the time-varying waveform, or changing an amplitude of the time-varying waveform.

10. A writing system comprising:
a magneto-electrophoretic display including:
a first electrode that is light-transmissive,
a second electrode,
a magneto-electrophoretic medium disposed between the first electrode and the second electrode, the magneto-electrophoretic medium comprising charged magnetic particles;
a stylus having a body having a first magnetic end; and
a voltage controller configured to supply voltage between the first electrode and the second electrode,
wherein the writing system has a viewing surface at the first electrode, and
wherein the writing system and has two modes:
a global erase mode in which the voltage controller provides a first voltage sufficient to drive the charged magnetic particles toward a viewing surface at the first electrode, and
a local erase mode in which the voltage controller applies a sub-threshold second voltage on the magneto-electrophoretic medium, and a supplemental magnetic field is applied by the stylus on the magneto-electric medium simultaneously with the sub-threshold second voltage, wherein the sub-threshold second voltage is greater than zero but insufficient to drive the charged magnetic particles to the viewing surface at the first electrode within five seconds, but the simultaneous application of the sub-threshold second voltage and the supplemental magnetic field is sufficient to drive the charged magnetic particles to the viewing surface at the first electrode and to cause the magneto-electrophoretic medium to switch from a first state to a second state.

11. The writing system of claim 10, wherein the charged magnetic particles are ferromagnetic.

12. The writing system of claim 11, wherein the charged magnetic particles are black.

13. The writing system of claim 12, wherein the magneto-electrophoretic medium further comprises non-magnetic white particles having an opposite electrical charge from the charged magnetic particles.

14. The writing system of claim 12, wherein the magneto-electrophoretic medium is colored.

15. The writing system of claim 11, wherein the charged magnetic particles are white.

16. The writing system of claim 15, wherein the magneto-electrophoretic medium further comprises non-magnetic dark-colored particles having an opposite electrical charge from the charged magnetic particles.

17. The writing system of claim 16, wherein the magneto-electrophoretic medium is colored.

18. The writing system of claim 10, wherein the stylus and the voltage controller are configured to communicate with each other wirelessly.

19. The writing system of claim 10, wherein the first voltage is greater than 20V.

20. The writing system of claim 10, wherein the sub-threshold second voltage is less than 20V.

21. The writing system of claim 20, wherein the sub-threshold second voltage is provided as a waveform having a duty cycle of less than 50%.

22. The writing system of claim 10, wherein the second electrode is light-transmissive.

23. The writing system of claim 10, wherein the body of the stylus further has a second end, and wherein the stylus further comprises:
a first permanent magnet proximal to the first end and providing a first magnetic field between 500 Gauss and 5000 Gauss at the first end;
a second permanent magnet proximal to the second end and providing a second magnetic field between 10 Gauss and 500 Gauss at the second end;
a wireless transmitter within the body; and
a switch on the body of the stylus, operatively connected to the wireless transmitter.

* * * * *